United States Patent
Beaurepaire et al.

(10) Patent No.: US 11,535,262 B2
(45) Date of Patent: Dec. 27, 2022

(54) METHOD AND APPARATUS FOR USING A PASSENGER-BASED DRIVING PROFILE

(71) Applicant: HERE GLOBAL B.V., Eindhoven (NL)

(72) Inventors: Jerome Beaurepaire, Berlin (DE); Aaron Rincover, Munich (DE)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/126,847

(22) Filed: Sep. 10, 2018

(65) Prior Publication Data
US 2020/0079385 A1  Mar. 12, 2020

(51) Int. Cl.
| | | |
|---|---|---|
| *B60W 40/09* | (2012.01) | |
| *B60W 30/02* | (2012.01) | |
| *G05D 1/00* | (2006.01) | |
| *G05D 1/02* | (2020.01) | |

(52) U.S. Cl.
CPC .......... *B60W 40/09* (2013.01); *B60W 30/025* (2013.01); *G05D 1/0088* (2013.01); *G05D 1/0212* (2013.01); *B60W 2556/00* (2020.02); *G05D 2201/0212* (2013.01); *G05D 2201/0213* (2013.01)

(58) Field of Classification Search
CPC ............... B60W 40/09; B60W 30/025; B60W 2600/00; G05D 1/0088; G05D 1/0212; G05D 2201/0212; G05D 2201/0213
USPC .......................................................... 701/25
See application file for complete search history.

(56) References Cited

U.S. PATENT DOCUMENTS

| | | |
|---|---|---|
| 8,831,813 B1 | 9/2014 | Ferguson et al. |
| 9,443,192 B1 | 9/2016 | Cosic |
| 9,971,348 B1 | 5/2018 | Canavor et al. |
| 2002/0107626 A1 | 8/2002 | Graf |
| 2007/0146146 A1 | 6/2007 | Kopf et al. |
| 2009/0234543 A1 | 9/2009 | Groitzsch et al. |
| 2010/0207812 A1* | 8/2010 | Demirdjian ............ G06Q 30/08 705/1.1 |
| 2015/0149023 A1 | 5/2015 | Attard et al. |
| 2015/0276415 A1 | 10/2015 | Shrinath et al. |
| 2016/0137152 A1 | 5/2016 | Park |
| 2016/0159368 A1 | 6/2016 | Tuukkanen |
| 2016/0264131 A1 | 9/2016 | Chan et al. |
| 2017/0169208 A1 | 6/2017 | Jantz et al. |
| 2017/0174221 A1* | 6/2017 | Vaughn .................. G05D 1/021 |

(Continued)

OTHER PUBLICATIONS

Basu et al., "Do You Want Your Autonomous Car to Drive Like You?", Feb. 5, 2018, 9 pages.

(Continued)

*Primary Examiner* — Tyler J Lee
*Assistant Examiner* — Tiffany P Ohman
(74) *Attorney, Agent, or Firm* — Ditthavong, Steiner & Mlotkowski

(57) ABSTRACT

An approach is provided for using a passenger-based driving profile. The approach involves detecting an identity of a user of a vehicle. The approach also involves retrieving a passenger profile of the user based on the identity. The passenger profile is generated based on sensor data indicating a reaction of the user to at least one vehicle driving behavior previously experienced by the user as a vehicle passenger. The approach further involves configuring the vehicle based on the passenger profile.

13 Claims, 21 Drawing Sheets

(56) References Cited

U.S. PATENT DOCUMENTS

| | | |
|---|---|---|
| 2017/0200321 A1 | 7/2017 | Hummel et al. |
| 2017/0217445 A1 | 8/2017 | Tzirkel-Hancock et al. |
| 2017/0267256 A1 | 9/2017 | Minster et al. |
| 2017/0285639 A1 | 10/2017 | Jones et al. |
| 2017/0330044 A1 | 11/2017 | Telepaz et al. |
| 2017/0369052 A1 | 12/2017 | Nagy et al. |
| 2018/0004211 A1* | 1/2018 | Grimm ............... G01C 21/3461 |
| 2018/0022361 A1 | 1/2018 | Rao et al. |
| 2018/0096403 A1 | 4/2018 | Yuhara et al. |
| 2018/0194366 A1 | 7/2018 | Krishnan et al. |
| 2018/0201273 A1 | 7/2018 | Xiao et al. |
| 2018/0208209 A1 | 7/2018 | Al-Dahle et al. |
| 2018/0253095 A1 | 9/2018 | Ryan |
| 2018/0267557 A1 | 9/2018 | Yan |
| 2018/0297592 A1 | 10/2018 | Kim et al. |
| 2018/0307925 A1 | 10/2018 | Wisniowski et al. |
| 2018/0356819 A1 | 12/2018 | Mahabadi et al. |
| 2019/0019122 A1* | 1/2019 | Allen ................. G06Q 10/0639 |
| 2019/0019133 A1 | 1/2019 | Allen |
| 2019/0050787 A1* | 2/2019 | Munafo ............... G05D 1/0088 |
| 2019/0072968 A1 | 3/2019 | Will, IV et al. |
| 2019/0122543 A1 | 4/2019 | Matus et al. |
| 2019/0184998 A1* | 6/2019 | Zheng ................. B60W 60/007 |
| 2019/0185014 A1 | 6/2019 | Choo |
| 2019/0187705 A1 | 6/2019 | Ganguli et al. |
| 2019/0187706 A1 | 6/2019 | Zhou et al. |
| 2019/0187707 A1 | 6/2019 | Zheng et al. |
| 2019/0187708 A1 | 6/2019 | Zheng et al. |
| 2019/0197430 A1 | 6/2019 | Arditi |
| 2019/0213429 A1 | 7/2019 | Sicconi et al. |
| 2019/0251509 A1 | 8/2019 | Simpson |

OTHER PUBLICATIONS

Scherer et al., "How the Driver Wants to Be Driven—Modelling Driving Styles in Highly Automated Driving", published 2015, 6 pages.

Hartwich et al., abstract of "Driving Comfort, Enjoyment, and Acceptance of Automated Driving—Effects of Driver's Age and Driving Style Familiarity", published online Feb 23, 2018, Journal Ergonomics vol. 61, 2018—Issue 8, 4 pages.

Office Action for related U.S. Appl. No. 16/126,837, dated Sep. 5, 2019, 9 pages.

Office Action for related U.S. Appl. No. 16/126,871, dated Aug. 28, 2019, 17 pages.

Office Action for related European Patent Application No. 19196127.5-1207, dated Dec. 20, 2019, 9 pages.

Office Action for related U.S. Appl. No. 16/126,837, dated Jan. 8, 2020, 31 pages.

Office Action for corresponding European Patent Application No. 19196146.5-1012, dated Jan. 10, 2020, 8 pages.

Office Action for related European Patent Application No. 19196237.2-1207, dated Jan. 29, 2020, 11 pages.

Office Action for related U.S. Appl. No. 16/126,837, dated Sep. 9, 2020, 36 pages.

Office Action for related U.S. Appl. No. 16/126,837, dated May 14, 2020, 49 pages.

Li et al., "Driving Maneuver Prediction using Car Sensor and Driver Physiological Signals", Publication: ICMI '16 Proceedings of the 18th ACM International Conference on Multimodal Interaction, Oct. 2016, pp. 108-112.

Office Action for Related European Application No. 19 196 146.5-1012, dated Apr. 22, 2021, 7 pages.

Office Action for related European Patent Application No. 19 196 146.5-1012, dated Feb. 4, 2022, 5 pages.

* cited by examiner

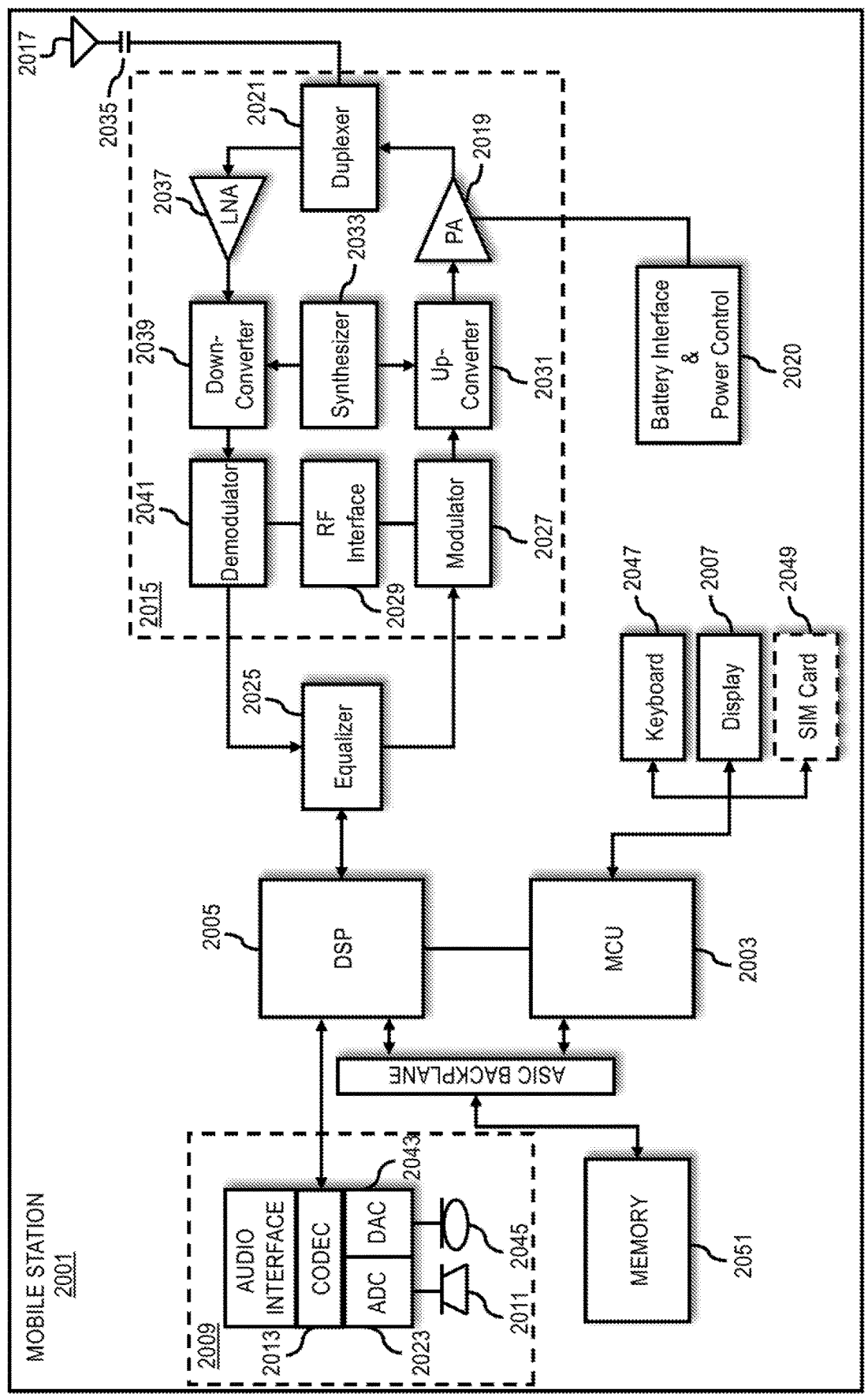

METHOD AND APPARATUS FOR USING A PASSENGER-BASED DRIVING PROFILE

BACKGROUND

There is increasing interest in the development of vehicles (e.g., autonomous vehicles, highly-assisted vehicles (HAD), etc.) that are able to at least partially drive or otherwise operate themselves without input from vehicle users or occupants. One area of development has been with respect to providing a "humanized" driving experience for such vehicles. For example, a humanized driving experience refers to configuring autonomous or HAD vehicles to operate in a way that is comfortable for their passengers or users. In particular, one source of potential discomfort is when there are differences in the driving style or behavior preferred by a user when the user is driving versus when the user is a passenger. Accordingly, service providers and manufacturers for such vehicles face significant technical challenges to enabling a more comfortable user experience by reconciling the differences between a user's personal driving style and the driving style that the user likes when the user is a passenger to configure the operation of autonomous or HAD vehicles.

SOME EXAMPLE EMBODIMENTS

Therefore, there is need for an approach for generating an using a passenger-based driving profile of a vehicle (e.g., an autonomous vehicle or other vehicle in which a user is not actively driving).

According to one embodiment, a computer-implemented method comprises detecting an identity of a user of a vehicle and/or service. The method also comprises retrieving a passenger profile of the user based on the identity. The passenger profile is generated based on sensor data indicating a reaction of the user to at least one vehicle driving behavior previously experienced by the user as a vehicle passenger. The method further comprises configuring the vehicle and/or service based on the passenger profile.

According to another embodiment, an apparatus comprises at least one processor, and at least one memory including computer program code for one or more programs, the at least one memory and the computer program code configured to, with the at least one processor, to cause, at least in part, the apparatus to detect an identity of a user of a vehicle and/or service. The apparatus also is caused to retrieve a passenger profile of the user based on the identity. The passenger profile is generated based on sensor data indicating a reaction of the user to at least one vehicle driving behavior previously experienced by the user as a vehicle passenger. The apparatus is further caused to configure the vehicle and/or service based on the passenger profile.

According to another embodiment, a non-transitory computer-readable storage medium carrying one or more sequences of one or more instructions which, when executed by one or more processors, cause, at least in part, an apparatus to detect an identity of a user of a vehicle and/or service. The apparatus also is caused to retrieve a passenger profile of the user based on the identity. The passenger profile is generated based on sensor data indicating a reaction of the user to at least one vehicle driving behavior previously experienced by the user as a vehicle passenger. The apparatus is further caused to configure the vehicle and/or service based on the passenger profile.

According to another embodiment, an apparatus comprises means for detecting an identity of a user of a vehicle and/or service. The apparatus also comprises means for retrieving a passenger profile of the user based on the identity. The passenger profile is generated based on sensor data indicating a reaction of the user to at least one vehicle driving behavior previously experienced by the user as a vehicle passenger. The apparatus further comprises means for configuring the vehicle and/or service based on the passenger profile.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 20 is a diagram of a terminal that can be used to implement an embodiment.

DESCRIPTION OF SOME EMBODIMENTS

Examples of a method, apparatus, and computer program for determining a driving profile of an autonomous vehicle are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to an autonomous vehicle, it is contemplated that the approaches of the various embodiments described herein are applicable to highly-assisted driving (HAD) vehicles as well as to manually driven vehicles. Moreover, although the autonomous vehicles described are autonomous automobiles, it is contemplated that the approaches of the various embodiments described herein are applicable to any type of passenger vehicle (e.g., buses, trains, planes, boats, etc.).

Figure 1:
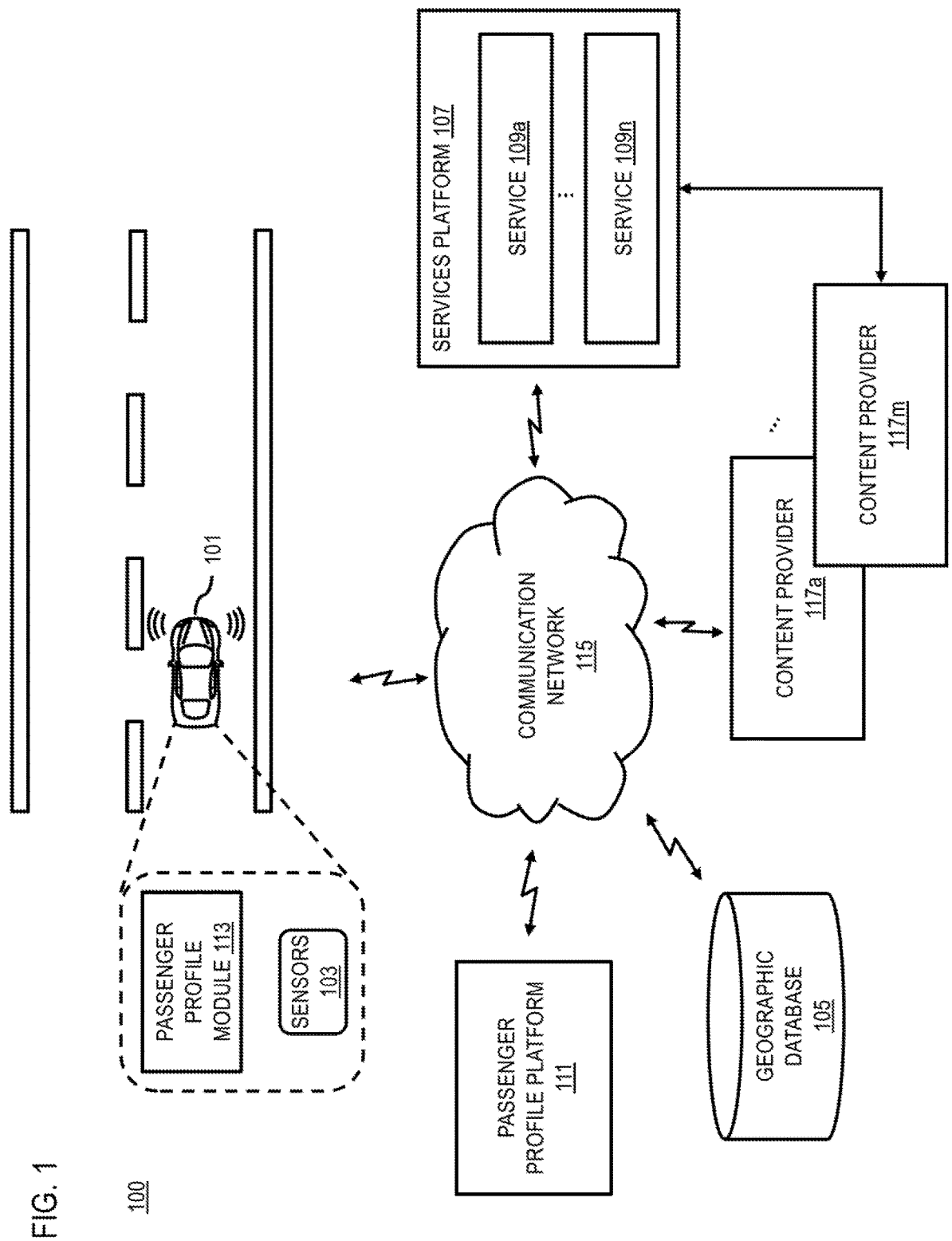
FIG. 1 is a diagram of a system capable of generating a passenger-based driving profile, according to one embodiment.

FIG. 1 is a diagram of a system capable of generating a passenger-based driving profile, according to one embodiment. As noted above, an autonomous vehicle (e.g., a vehicle 101) is capable of driving itself without the input of vehicle passengers or occupants. In some embodiments, the vehicle 101 achieves this self-driving capability by using sensor systems (e.g., sensors 103) in combination with, for instance, map data (e.g., three-dimensional map data stored in a geographic database 105) and information received from network-based services and/or other vehicles. With this information, the vehicle 101 generally can react to changing situations faster than a typical human driver. As a result, autonomous vehicles are able to safely operate using operational parameters (e.g., vehicle speed, acceleration rate, braking rate, lateral acceleration, etc.) that can often exceed what is a comfortable driving experience for a user.

For example, while in traffic, an autonomous vehicle typically can safely operate at higher speeds (or higher acceleration, faster braking, shorter following distance, greater speed on curves or turns, etc.) than a human driver would normally use. However, this speed or other operational parameter might exceed values that are comfortable for the occupants or passengers. This discomfort may result at least partially from the disparity between what a passenger can see from the vehicle versus what can be sensed by the vehicle. This disparity can then lead, for instance, to a situation where an autonomous vehicle configures itself to drive at faster speeds (e.g., up to a posted speed limit) in situations where a human driver would slow down due to low visibility. Such a conflict can cause discomfort for the passengers and in some cases, lead to one or more of the passengers interfering with the autonomous driving activity (e.g., by hitting a panic button to stop the autonomous driving activity) or otherwise taking manual control, thereby resulting in a poor user experience.

In one embodiment, to provide for a more comfortable driving experience, the system 100 can monitor the driving behavior (e.g., speeds, acceleration rates, braking rates, speed on curves, following distances, and/or the like) of a user as the user drives a vehicle. This driving behavior data can then be used to configure the driving style of a vehicle carrying the corresponding user to provide a more "humanized" driving experience (e.g., a driving style that more closely matches the driving behavior of the user). However, in some cases, the user may be comfortable with the user's own driving style while the user is driving, but may be uncomfortable with his or her own driving style while being a passenger. In other words, many users may feel that "the way I drive is not necessarily how I want to be driven."

Figure 2:
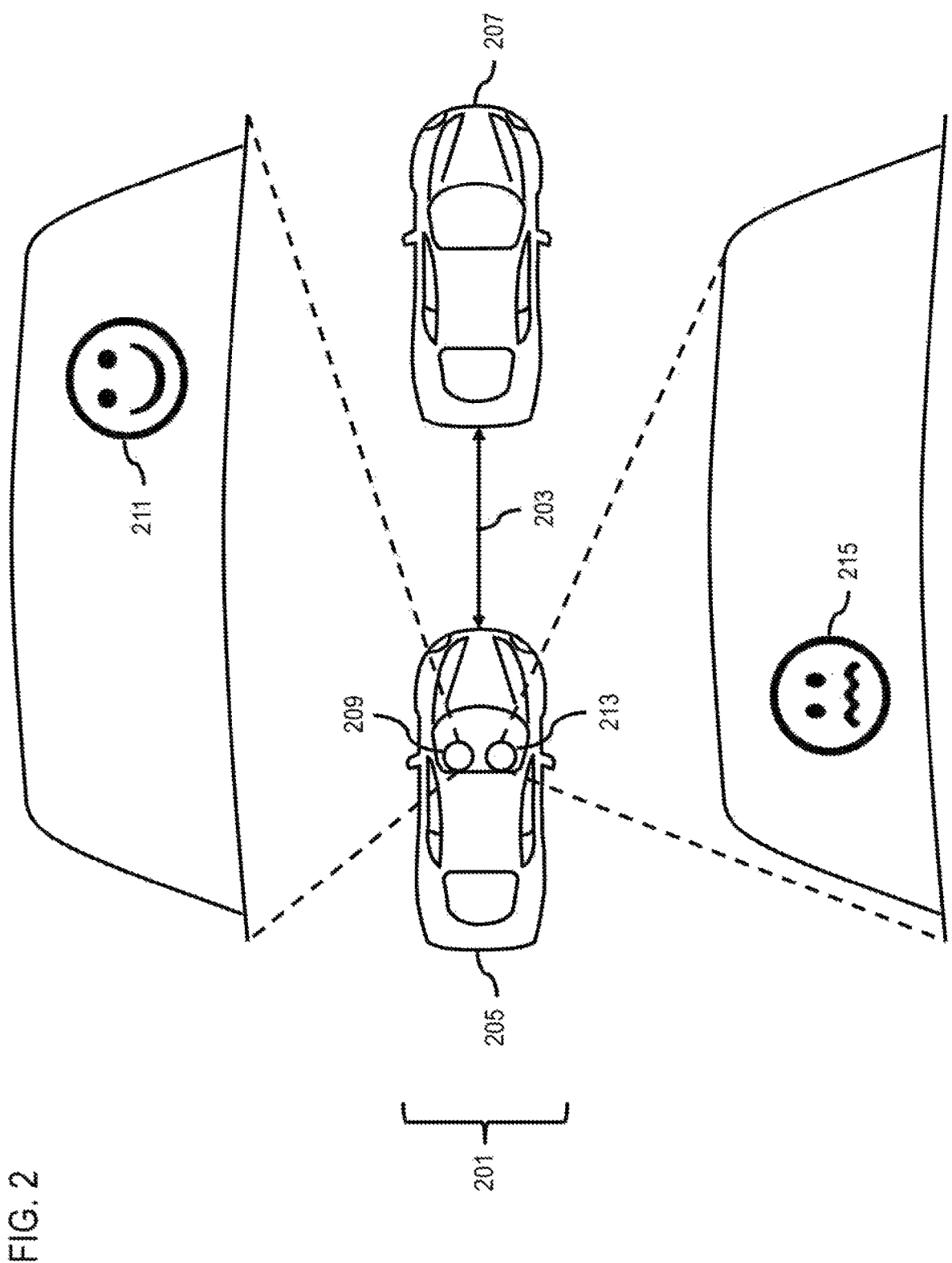
FIG. 2 is a diagram illustrating an example of different user reactions to the same driving behavior while driving a vehicle versus riding as a passenger, according to one embodiment.

FIG. 2 is a diagram illustrating an example of different user reactions to the same driving behavior while driving a vehicle versus riding as a passenger, according to one embodiment. In the example of FIG. 2, the driving behavior 201 is a following distance 203 between a user's vehicle 205 and another vehicle 207. In a scenario where the user driving the vehicle 205 in the driving position 209, the user has a positive reaction 211 (e.g., a smile detected by a facial recognition system of the vehicle 205) that indicates that the user is comfortable with the following distance 203. However, when the user is in the passenger position 213 and the vehicle 205 is operated autonomously using the same following distance 203, the user has a negative reaction 215 (e.g., a scared facial expression detected by a facial recognition system of the vehicle 205). This indicates that the user does not like being driven as a passenger using the following distance 203, but is comfortable with using the following distance 203 when the user is driving. This disparity between driving comfort and passenger comfort typically arises because the user feels more in control (and therefore more comfortable) while driving as opposed to while riding as a passenger.

Based on the scenario illustrated above, if the system 100 adapts the vehicle 101's driving style based solely on the user's recorded driving style or driving behavior data when the user is a passenger, the system 100 may nonetheless provide a poor user experience. Accordingly, service providers and vehicle manufacturers face significant technical challenges to configure the vehicle 101 to provide a comfortable driving experience for a user when the vehicle 101 is carrying the user as a passenger.

To address this problem, the system 100 of FIG. 1 introduces a capability to determine the most suitable driving style for a passenger of the vehicle 101 (e.g., an autonomous vehicle) using available sensor information (e.g., from sensors 103) and/or other data sources (e.g., mapping data from the geographic database 105, and/or weather or other contextual data from a services platform 107 and/or any of its services 109a-109n—such as weather services, traffic services, etc.). For example, while a "regular driver profile" (e.g., a driving behavior profile created by monitoring a user's driving behavior) might faithfully mimic a driver's style, an "aggressive" driver (e.g., operates the vehicle 101 at higher speeds, acceleration, etc. while driving) might not be comfortable with an "aggressive" driving style while the user is a passenger instead of a driver. Conversely, a "conservative" driver (e.g., operates the vehicle 101 at lower speeds, etc. while driving) might be uncomfortable with such conservative driving and want a more aggressive style when riding as a passenger.

In one embodiment, to determine the level of comfort/discomfort, the system 100 can monitor vehicle driving behaviors (e.g., maneuvers, turns, speeds, etc.) and the corresponding reaction of the user to the driving behaviors using sensors 103 and/or user feedback input. In one embodiment, if system 100 (e.g., via a cloud-based passenger profile platform 111 and/or a vehicle-based passenger profile module 113) detects that the user has a positive reaction or comfort level to current driving style or behavior of the monitored vehicle 101, the system 100 can store this reaction (e.g., comfort level or tolerance) in the user's passenger profile. The stored positive reaction, for instance, can indicate that the vehicle 101 can be driven according to the driving behavior or style corresponding to the reaction, even if the behavior varies from the user's own driving style. If the system 100 detects that the user has a negative reaction or discomfort level with a driving behavior, the system 100 can update the user's passenger profile with the collected information to specify the driving behavior or elements of the driving behavior (e.g., acceleration patterns, braking patterns, distance to neighboring vehicles, speed in curves, etc.) that corresponds to the negative reaction or discomfort.

In one embodiment, after creating the passenger profile based on the collected driving behavior and user reaction data, the system 100 can use the passenger profile data to adapt the driving style of the vehicle 101 (e.g., when the vehicle 101 is operated in autonomous mode or someone other than the user is driving). In other embodiments, the passenger profile can be used to configure other vehicle-related services such as but not limited to ride-sharing services, vehicle recommendation services, and/or the like. It is noted that the uses of the passenger profile described herein are provided by way of example and not as limitations. It is contemplated that the passenger profile created from vehicle driving behavior data and reaction data from passengers can be used to support any use case where passenger profile data can be used.

Figure 3:
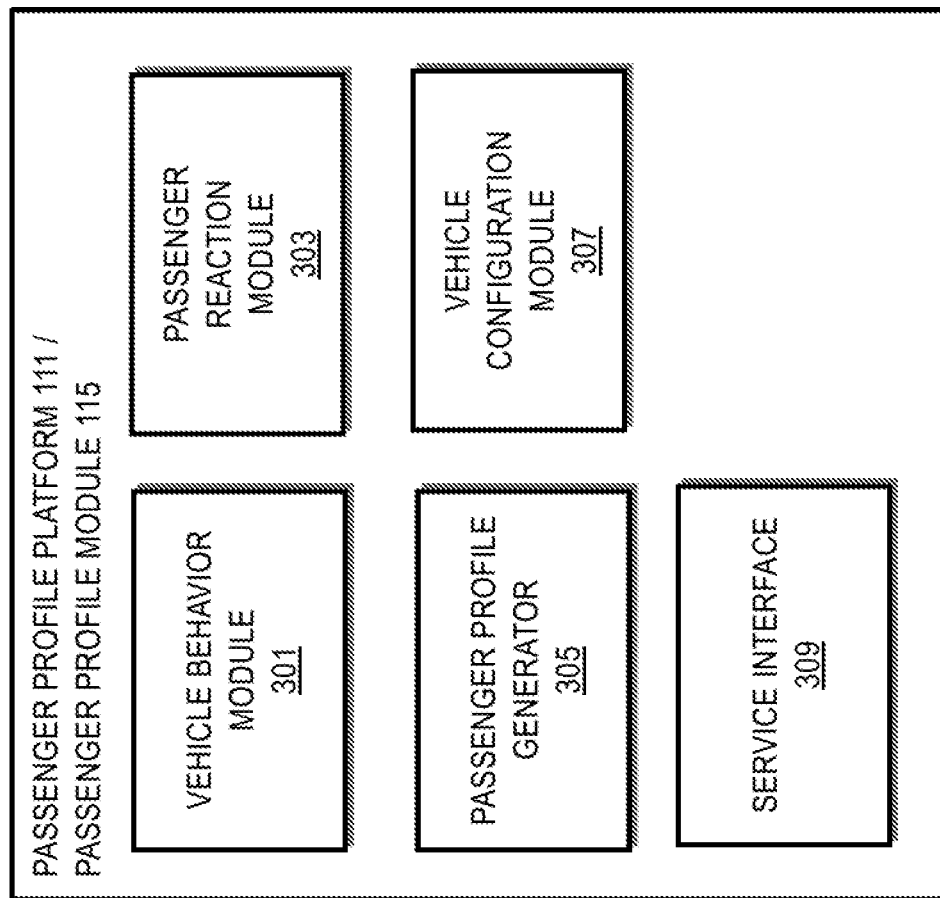
FIG. 3 is a diagram of the components of a passenger profile platform, according to one embodiment.

In one embodiment, the passenger profile platform 111 performs the functions associated with generating and using a passenger profile according to the embodiments described herein. FIG. 3 is a diagram of the components of the passenger profile platform 111, according to one embodiment. In one embodiment, the passenger profile module 113 of the vehicle 101 can perform all or a portion of the functions of the passenger profile platform 111 alone or in combination with the passenger profile platform 111. By way of example, the passenger profile platform 111 and/or passenger profile module 113 include one or more components for determining a passenger driving profile for a vehicle according to the various embodiments described herein. It is contemplated that the functions of these components may be combined or performed by other components of equivalent functionality. In this embodiment, the passenger profile platform 111 and/or passenger profile module 113 include a vehicle behavior module 301, passenger reaction module 303, passenger profile generator 305, vehicle configuration module 307, and service interface module 309. The above presented modules and components of the passenger profile platform 111 and/or passenger profile module 113 can be implemented in hardware, firmware, software, or a combination thereof. Though depicted as separate entities in FIG. 1, it is contemplated that the passenger profile platform 111 and/or passenger profile module 113 may be implemented as a module of any of the components of the system 100 (e.g., a component of the vehicle 101, services platform 107, services 109a-109n (also collectively referred to as services 109), etc.). In another embodiment, one or more of the modules 301-309 may be implemented as a cloud-based service, local service, native application, or combination thereof. The functions of the passenger profile platform 111, passenger profile module 113, and modules 301-309 are discussed with respect to FIGS. 4-17 below.

Figure 4:
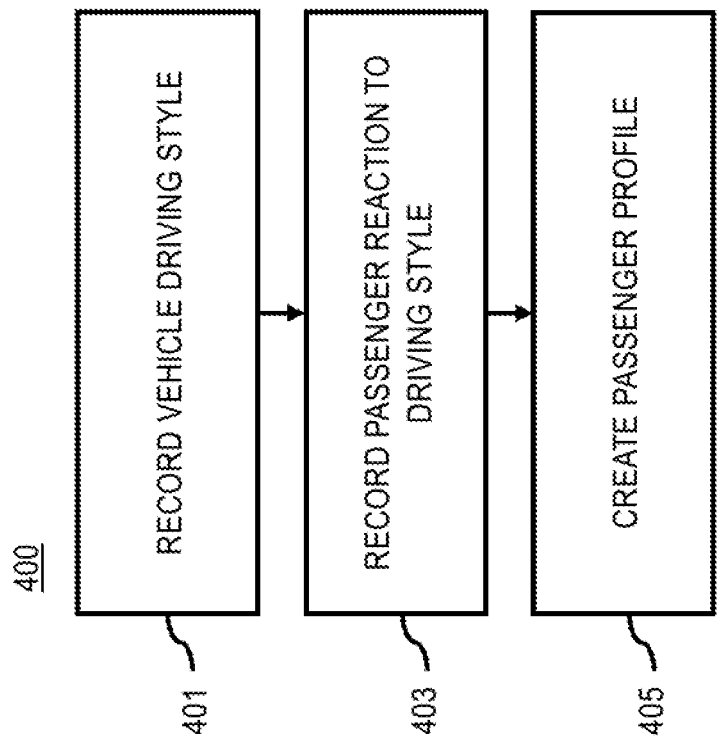
FIG. 4 is a flowchart of a process for generating a passenger profile, according to one embodiment.
Figure 19:
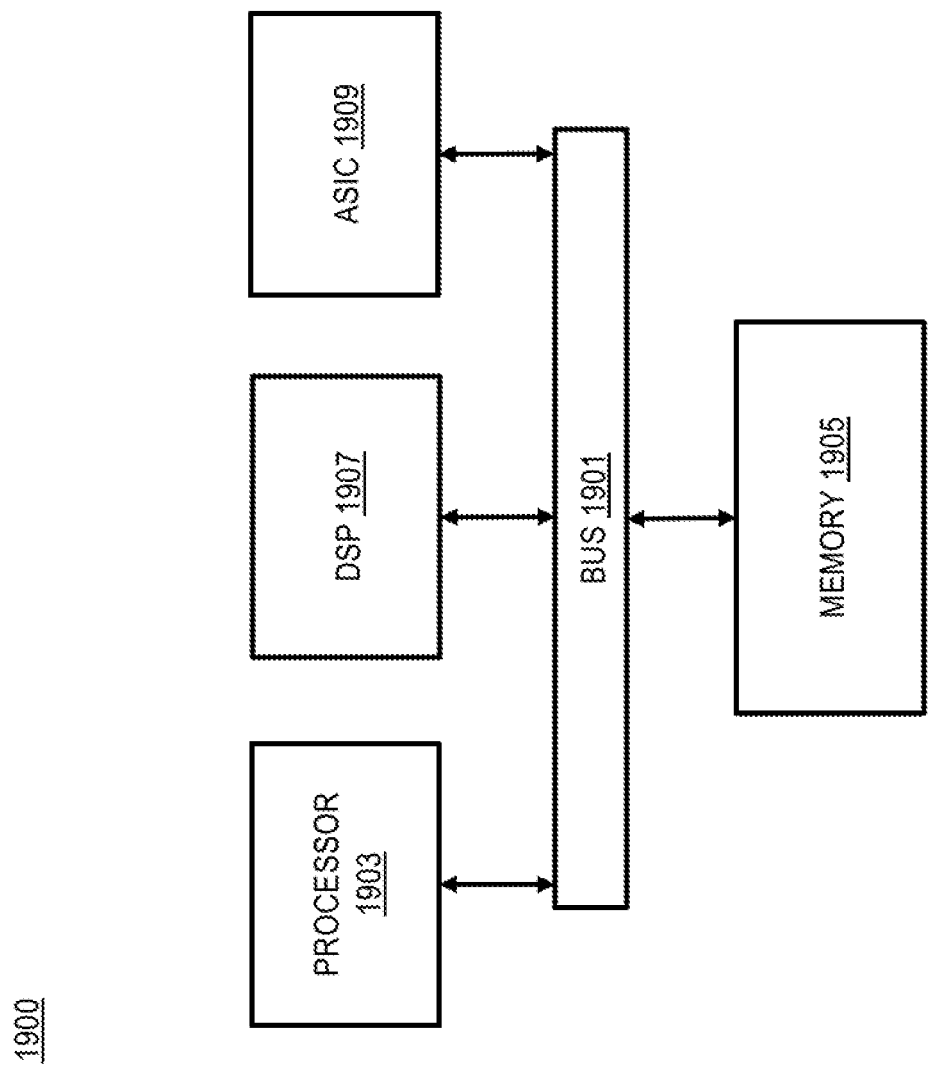
FIG. 19 is a diagram of a chip set that can be used to implement an embodiment.

FIG. 4 is a flowchart of a process for generating a passenger profile, according to one embodiment. In various embodiments, the passenger profile platform 111, passenger profile module 113, and/or any of the modules 301-309 may perform one or more portions of the process 400 and may be implemented in, for instance, a chip set including a processor and a memory as shown in FIG. 19. As such, the passenger profile platform 111, passenger profile module 113, and/or any of the modules 301-309 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all of the illustrated steps.

In step 401, the vehicle behavior module 301 collects or records vehicle sensor data of a vehicle carrying a user as a passenger. The vehicle sensor data indicates or relates to at least one driving behavior of the vehicle. By way of example, driving behavior or style includes but is not limited to physical measurements or parameters that record how the vehicle is being driven. In one embodiment, the at least one driving behavior includes an acceleration pattern, a braking pattern, a distance to a neighboring vehicle, a vehicle speed on a curved section, a vehicle turning behavior (e.g., how quickly a vehicle turns, the size of vehicle gaps through which a turn can be made, etc.), or a combination thereof. In other words, the driving behavior can be defined according to physical parameters such as but not limited to acceleration patterns (e.g., acceleration rates over time under various contexts such as road type, time of day, traffic level, visibility, weather, etc.), braking patterns (e.g., how quickly or abruptly the vehicle braking system is actuated under different contexts), distance to nearby vehicles (e.g., following or leading distances, gaps between other vehicles when making turns or other maneuvers, etc.), speed in curves, etc. The driving behavior can be an individual parameter or any combination thereof the parameters. In addition, the driving behavior can be fused with a particular context (e.g., a time, location, activity, maneuver, etc.) so that a user reaction can be determined for the driving behavior alone or in combination with one or more contexts.

Figure 5:
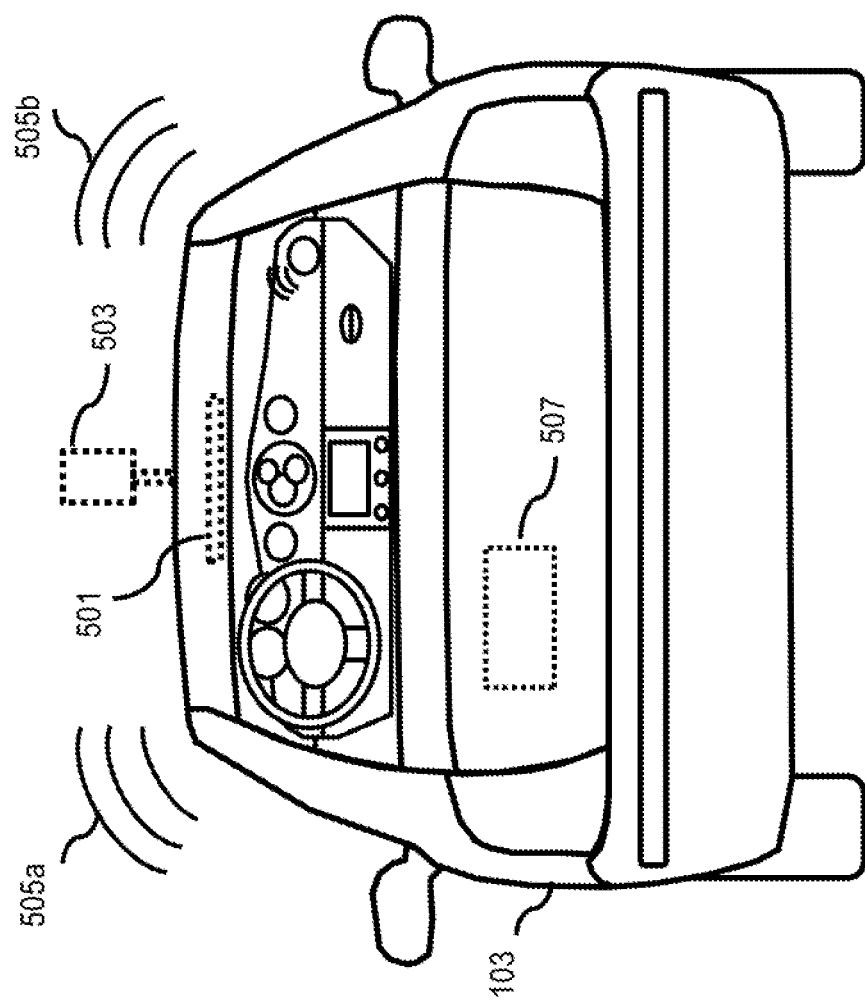
FIG. 5 is a diagram illustrating example vehicle sensors capable of collecting vehicle driving behavior data, according to one embodiment.

As shown in FIG. 5, in one embodiment, to provide vehicle measurements or data that can be used to characterize a driving style, a vehicle 101 can be equipped with a number of sensors to measure driving behavior. These sensors can include but are not limited to location sensors 501 (e.g., GPS or other satellite-based receivers), LiDAR sensors 503, radar sensors 505a and 505b, and other sensors 507 (e.g., accelerometers, compasses, gyroscopes, etc. as described in further detail below). These sensors 501-507 and/or any other equivalent or similar sensors can be configured to collect data indicating driving behavior such as an acceleration pattern, a braking pattern, a distance to a neighboring vehicle, a vehicle speed on a curved section, a vehicle turning behavior, and/or the like.

In one embodiment, this sensor data is collected when the vehicle behavior module 301 detects that the user is a passenger. The user can be considered a passenger of a vehicle when the user is physically present within a vehicle but is not actively driving or operating the vehicle under the user's manual control. Therefore, the vehicle behavior module 301 can interface with a vehicle's control system to determine whether it is operating in an autonomous mode (autonomous driving modes are described in further detail below). If the vehicle is in any autonomous mode, the vehicle behavior module 301 can assume that the user is a passenger and then begin collecting sensor data to determine a driving behavior of the vehicle. In other embodiments, the user can be a passenger when riding in a vehicle operated by another human driver. In this case, the vehicle behavior module 301 can detect that the user is a passenger by first determining that the vehicle is operating in manual mode and then detecting that the user is not in the driver's position (e.g., detected via sensors in the seating positions, image-based analysis of images of the user's driving position, and/or any other equivalent means). It is noted that the above means for detecting that a user is a passenger in a vehicle is provided by way of illustration and not as limitations.

Figure 6A:
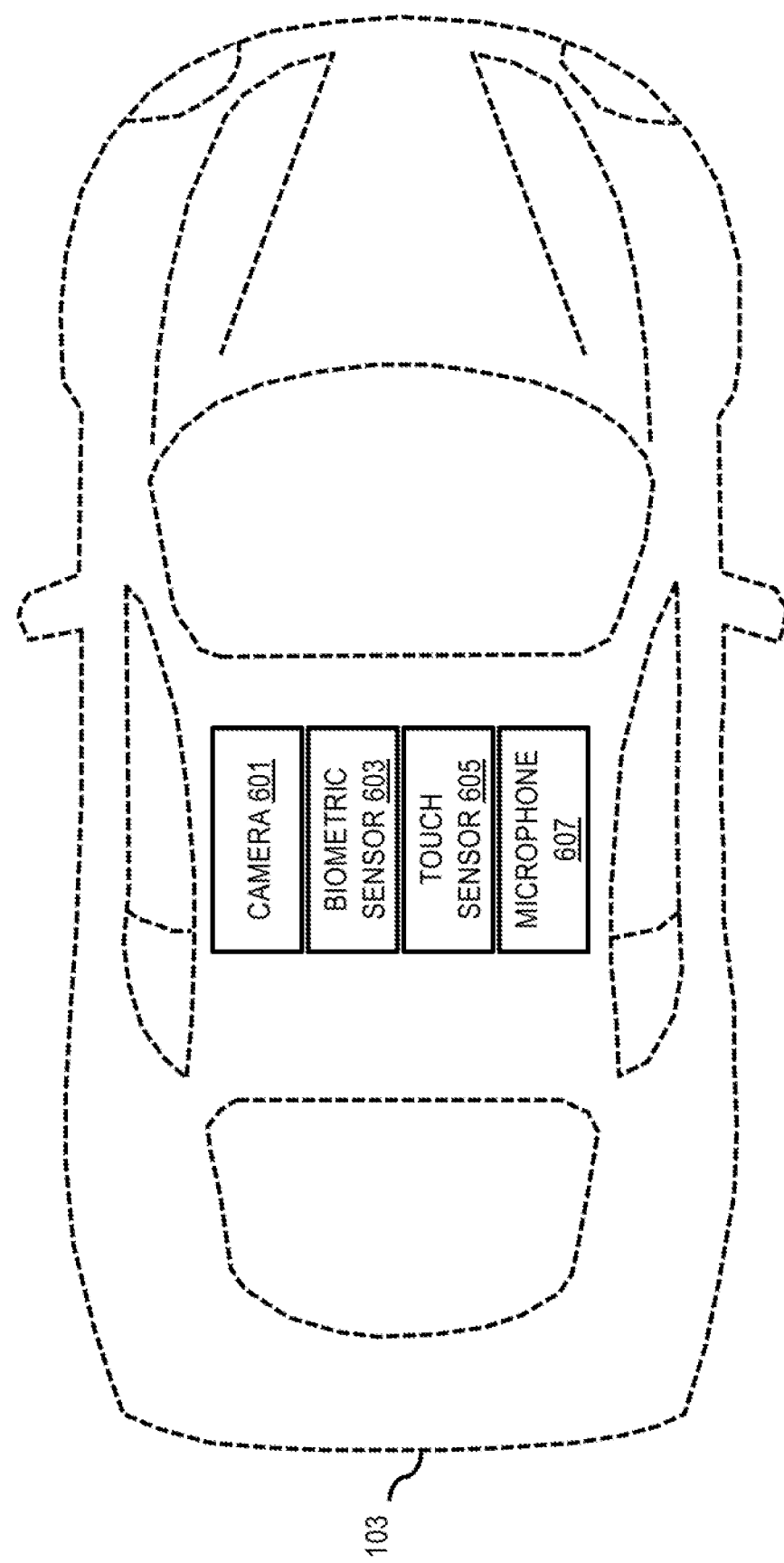
FIGS. 6A and 6B are diagrams illustrating example vehicle sensors capable of collecting user reaction data, according to one embodiment.

In step 403, the passenger reaction module 303 collects or records user sensor data, user input data, or a combination thereof indicating a reaction of the user to the at least one driving behavior. In one embodiment, the reaction can include a level of discomfort or discomfort that the user is experiencing in response to the corresponding driving behavior. As shown in FIG. 6A, the user sensor data, for instance, can be collected from one or more sensors of the vehicle 101. In addition or alternatively, the user sensor data can be collected from a device (e.g., a smartphone, wearable device, etc.) associated with the user that is equipped with the same or similar sensors illustrated in FIG. 6A. By way of example, the one or more sensors illustrated in FIG. 6A include but are not limited to at least one of: (1) a camera sensor 601 configured to detect a facial movement, an eye movement, a body movement, or a combination thereof of the user that is indicative of the reaction; (2) a biometric sensor 603 such as a heart rate sensor configured to detect a heart rate, a change in the heart rate, or a combination thereof of the user that is indicative of the reaction; (3) a touch sensor 605 configured to detect a touch of a vehicle component by the user that is indicative of the reaction; and (4) a microphone 607 in combination with a speech recognition module configured to sample a recognition speech or sound from the user that is indicative of the reaction.

Figure 6B:
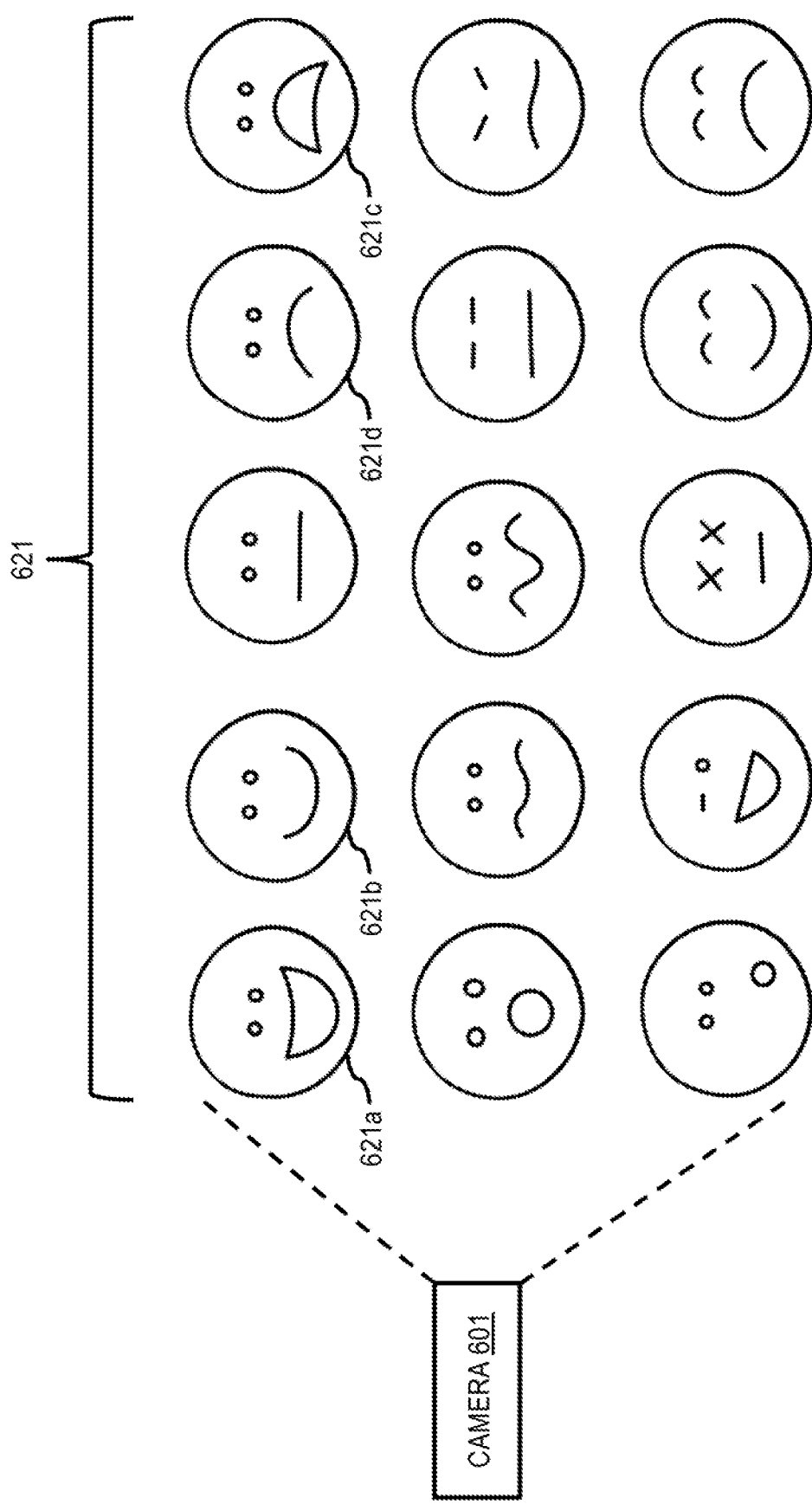

In one embodiment, the passenger reaction module 303 processes the collected user sensor data corresponding to a driving behavior determines a user reaction (e.g., a comfort level, a discomfort level, or a combination thereof) of the user based on the detected reaction to the driving behavior. For example, camera detection can be used to identify facial movements, eye movements, or body movements that have been previously associated with a given user reaction (e.g., comfort level or discomfort level). As shown in the example of FIG. 6B, a camera sensor 601 can be used to capture an image of a user while the user is a passenger in the vehicle 101 operating under a corresponding driving behavior. The resulting image data can be processed to identify one of a number of possible user facial expressions 621 that have been associated with a user comfort level or discomfort level. For example, a detected facial expression 621a indicating a large smile by the user can be correlated with a high comfort level, and a detected facial expression 621b with a medium smile can be correlated with a medium comfort level. Similarly, a detected facial expression 621c with a large frown can be correlated with a high discomfort level, and a detected facial expression 621d with a medium frown can be correlated with a medium discomfort level.

Similar correlations can be determined for the other sensor types associated with detecting user reactions. For example, heart rate monitoring via biometric sensors 603 use different heart rates to determine a magnitude of a reaction. A higher detected heart rate can indicate a higher level of comfort or discomfort, which a lower heart rate can indicate a lower level of comfort or discomfort. Touch sensors 605 located on various buttons, controls, seats, handles, etc. can provide sensor data indicate a how hard (e.g., a grasping intensity) the passenger is holding on to a monitored surface, handle, or touchable object in the vehicle 101. Higher grasping intensity (e.g., a grasping intensity above a threshold value), for instance, can be correlated with higher levels of discomfort. Similarly, the microphone 607 sensor can be used to capture words or other utterances (e.g., screams, laughter, etc.) that can be processed using speech recognition or other audio processing. The words and/or utterances can be compared against a dictionary previously associated with various comfort or discomfort levels. In one embodiment, silence or things not being said (e.g., detected gaps in conversation, etc.) can also be indicators of a comfort or discomfort level.

In one embodiment, the passenger reaction module 303 can use any combination of one or more of the sensors to determine a user reaction to a corresponding driving behavior. For example, the passenger reaction module 303 can use machine learning models (e.g., neural networks, support vector machines, regression models, random forest, decision trees, etc.) that have been trained to accept the user reaction sensor data as an input for classification into one or more reactions or comfort/discomfort levels.

In one embodiment, the passenger reaction module 303 can also request and receive user input data via a user interface device of the vehicle to indicate the vehicle behavior and/or the user's reaction to the corresponding driving behavior. In this way, the user can more explicitly indicate the driving behavior and/or reaction, as well as edit any behaviors and/or reactions automatically detected by the passenger profile platform 111. The process for providing a user interface to determine user reaction data and/or vehicle driving behavior data is described in more detail below with respect to FIG. 9.

In step 405, the passenger profile generator 305 creates a passenger profile using the collected vehicle sensor data and the user reaction data. For example, the passenger profile generator 305 can fuse the user reaction data with the collected information on the corresponding vehicle driving behavior (e.g., based on the car's vehicle sensor data). In other words, the passenger profile generator 305 can create a data structure that relates a given driving behavior with the user's detected reaction to the driving behavior while the user is riding as a passenger of a monitored vehicle. This association or data structure represents stores data on the driving behaviors that are preferred (e.g., indicated by positive reactions or higher comfort levels) and/or not preferred (e.g., indicated by negative or lower comfort levels) by the user.

In one embodiment, the passenger profile generator 305 can provide for greater granularity in the passenger profile by further fusing the driving behavior with additional contextual data. For example, the passenger profile generator 305 can map match the driving behavior to the portions of the street network or map data (e.g., as stored in the geographic database 105) on which the driving behavior occurred. Other contextual parameters or data can also be fused such as but not limited to weather, traffic conditions, and/or any other detectable contexts inside or outside the vehicle.

In one embodiment, the passenger profile generator 305 includes or excludes the at least one driving behavior in a passenger profile for the user based on the reaction of the user (e.g., a determined comfort or discomfort level). Alternatively, the passenger profile generator 305 can include all driving behaviors and their corresponding reactions in the passenger profile. In one embodiment, the passenger profile generator 305 processes one or more features of the at least one driving behavior, the reaction, the vehicle, the contextual parameter, or a combination thereof using a machine learning model to determine one or more driving scenarios to include or exclude in the passenger profile. The features, for instance, can include any of the characteristics or values determined from the vehicle or user sensor data, the vehicle or user sensor data itself, related contextual parameters, characteristics of the user/vehicle/sensors, and/or the like.

In one embodiment, the passenger profile can be generated to include only driving behaviors that are associated with positive or comfortable reactions (e.g., reactions indicating a comfort level above a threshold value). In this case, the passenger profile would be a "white-list" profile of driving behaviors or maneuvers preferred or otherwise acceptable to a user when riding as a passenger. In another embodiment, the passenger profile can be generated to include only driving behaviors that are associated with negative or uncomfortable reactions (e.g., reactions indicating a discomfort level above a threshold value). In this case, the passenger profile would be a "black-list" profile of driving behaviors or maneuvers to avoid when carrying a user as passenger. By way of example, such a black-list passenger profile can be created by monitoring reactions to drivers who drive poorly or are known to create discomfort for their passengers. In other embodiments, the passenger provide can include a combination of both the white-list and black-list profiles.

Figure 7:
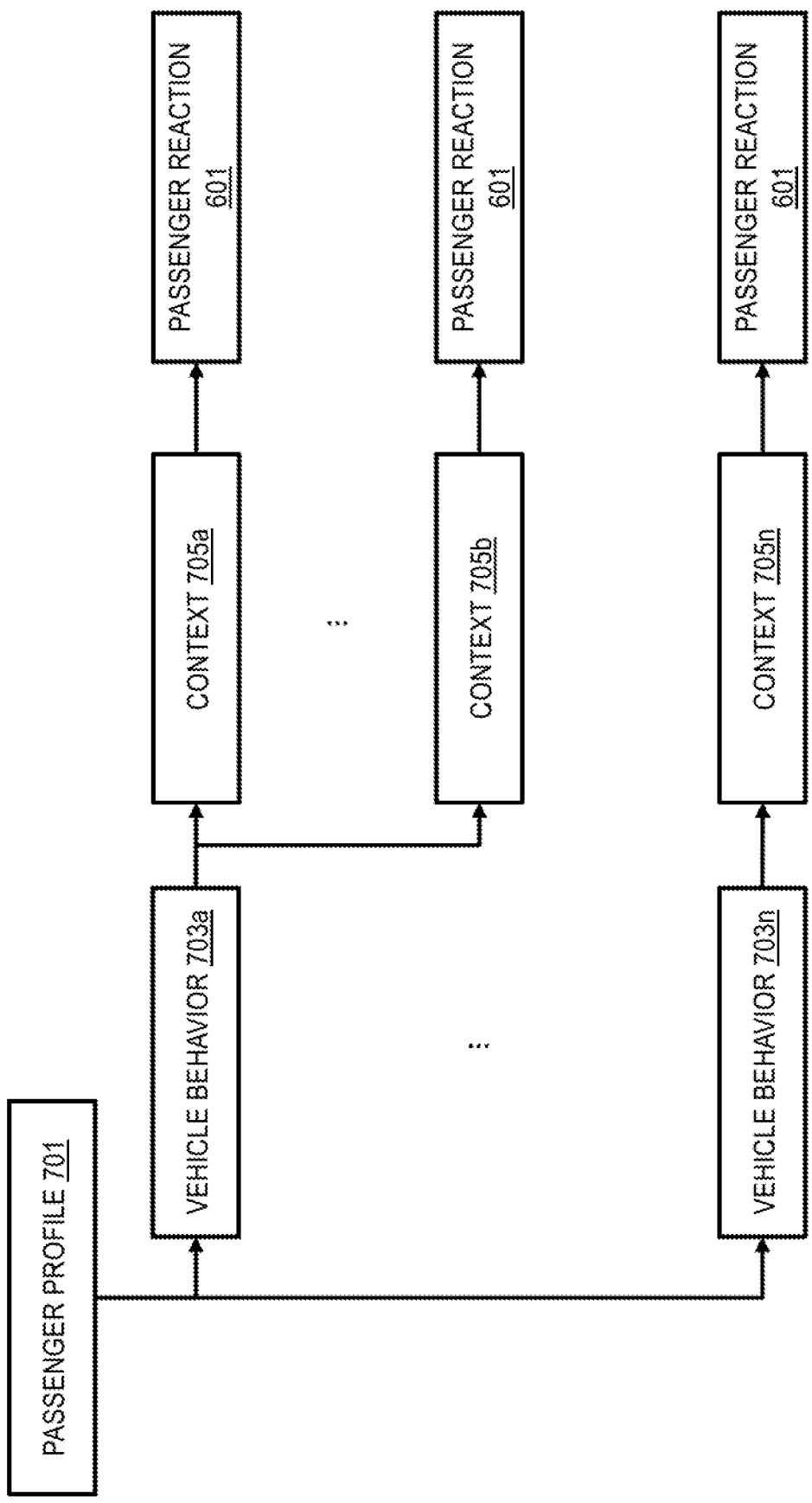
FIG. 7 is a diagram illustrating an example structure of a passenger profile, according to one embodiment.

FIG. 7 is a diagram illustrating an example structure of a passenger profile, according to one embodiment. In the example of FIG. 7, the passenger profile 701 stores data records for vehicle behaviors 703a-703n (also collectively referred to as vehicle behaviors 703). Each vehicle behavior 703 can be fused with one or more contexts 705a-705m (also collectively referred to as contexts 705). As described above, each context 705 can be based one or more contextual parameters that corresponds to a detected driving behavior. In other words, the at least one driving behavior can be included in the passenger profile with respect to a contextual parameter such as but not limited to a road link/segment in street network, a weather condition, a traffic condition, an in-vehicle context, an external context, a user activity, or a combination thereof. As other examples, the contextual parameters can include a visibility of oncoming traffic, a line-of-sight of the user, and/or any other detectable or reported contextual parameter.

The passenger profile generator 305 then associates the detected user reaction (e.g., comfort and/or discomfort level) with each corresponding vehicle driving behavior 703 and/or each context 705 in the passenger profile 701. The resulting passenger profile 701 can then be stored in the cloud (e.g., the passenger profile platform 111) and/or the locally at the vehicle or user device (e.g., the passenger profile module 113) for future use.

Figure 8:
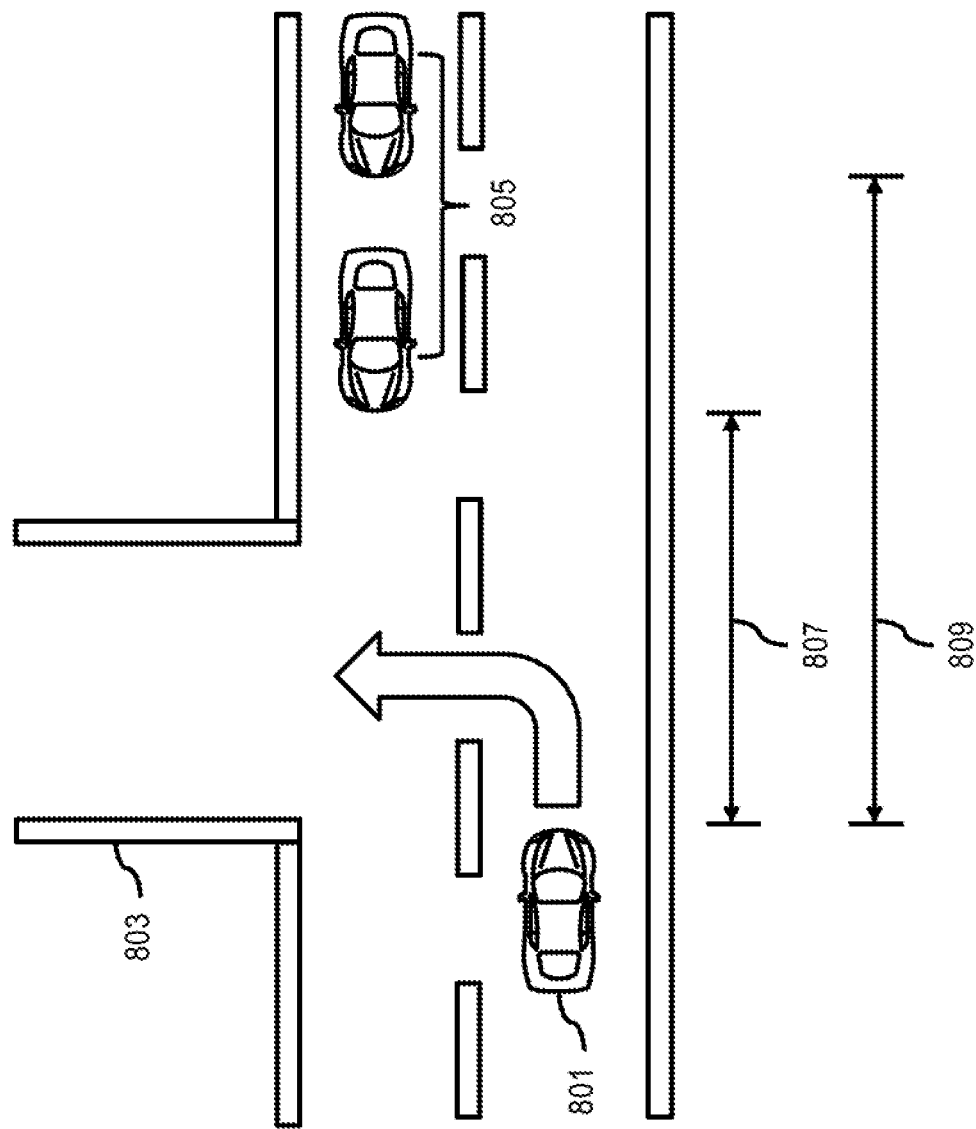
FIG. 8 is a diagram illustrating an example driving behavior or scenario that can be included in a passenger profile, according to one embodiment.

FIG. 8 is a diagram illustrating an example driving behavior or scenario that can be included in a passenger profile, according to one embodiment. The example of FIG. 8 illustrates a common scenario in which a driver of a vehicle 801 is required to turn left onto a cross street 803 with oncoming traffic 805. Sometimes, this requires the driver of the vehicle 801 to make the turn with limited visibility, e.g., taking a go/no-go decision with limited visibility and suddenly deciding to go with a distance 807 to the oncoming traffic 805. Depending on length of the distance 807, the sudden maneuver by the driver can lead to having the oncoming traffic 805 brake or slow down to the vehicle 801 make the left turn. While the driver may be comfortable with making the turn at the distance 807 to do this type of "forcing" maneuver when he or she is driving, he or she may not be comfortable having someone else or an autonomous vehicle do this type of maneuver or make the maneuver at the same distance 807. Instead, when riding as a passenger, he or she may prefer or be comfortable a longer distance 809 than the distance 807 to the oncoming traffic 805 to make a similar left turn.

As a result, if a driving profile is developed based only on the user's own driving behavior, the system 100 may not capture discrepancies arising from different preferences of the same user when driving versus when riding as a passenger. Accordingly, in one embodiment, the passenger profile platform 111 can compute or generate a driver profile (e.g., based on a user's own driving behavior) as well a passenger profile (e.g., as generated according to the embodiment described herein) for each user. The passenger profile platform 111 can also monitor the user's reactions to as a passenger over time (e.g., over years) to capture evolving preferences. For example, a user may be more comfortable with faster or more aggressive autonomous driving as the user gains more experience and builds more trust in the driving decision made by autonomous vehicles.

As discussed above, the passenger profile platform 111 can use machine models to train a predictive model based on the detected driving behaviors scenarios, user reactions, and/or other contextual data to determine which driving behaviors/scenarios are preferred by a user when riding as a passenger. It is noted that although the various embodiments described herein are discussed with respect to the user being a passenger in an automobile, it is contemplated that the embodiments described herein are also applicable to any form of transportation in which the user can be a passenger (e.g., public transportation, planes, ships, trains, etc.).

Figure 9:
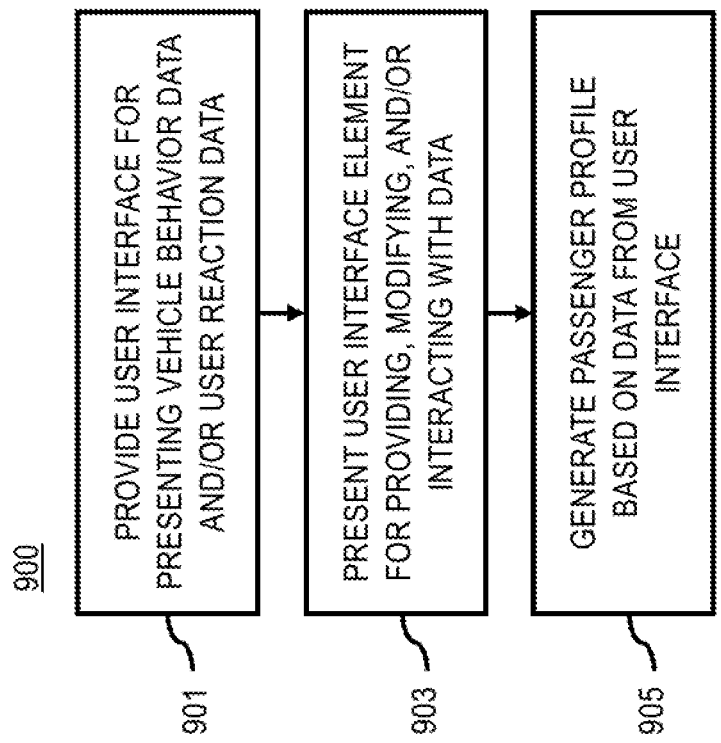
FIG. 9 is a flowchart of a process for providing a user interface for collecting vehicle driving behavior and/or user reaction data, according to one embodiment.

FIG. 9 is a flowchart of a process for providing a user interface for collecting vehicle driving behavior and/or user reaction data, according to one embodiment. In various embodiments, the passenger profile platform 111, passenger profile module 113, and/or any of the modules 301-309 may perform one or more portions of the process 900 and may be implemented in, for instance, a chip set including a processor and a memory as shown in FIG. 19. As such, the passenger profile platform 111, passenger profile module 113, and/or any of the modules 301-309 can provide means for accomplishing various parts of the process 900, as well as means for accomplishing embodiments of other processes described herein in conjunction with other components of the system 100. Although the process 900 is illustrated and described as a sequence of steps, its contemplated that various embodiments of the process 900 may be performed in any order or combination and need not include all of the illustrated steps.

As discussed above with respect to the process 400 of FIG. 4, the passenger profile platform 111 can collect driving behavior and user reaction data to generate a passenger profile that stores information on what driving behaviors that the user is comfortable and/or uncomfortable with while riding in a vehicle as a passenger (in contrast to being a driver of the vehicle). The embodiments of the process 900 as described herein one example but not exclusive means for obtaining user input for indicating and/or editing driving behavior and user reaction data.

In step 901, the passenger profile platform 111 (e.g., via the vehicle behavior module 301 and/or the passenger reaction module 303) provides a user interface on a device to present vehicle sensor data, user sensor data, or a combination thereof collected from one or more sensors of vehicle carrying a user as a passenger. By way of example, the device can include but is not limited to a vehicle-embedded device, a mobile device, wearable device, or a combination thereof. Other examples of a device for presenting the embodiments of the user interface described herein include any type of embedded terminal, mobile terminal, fixed terminal, or portable terminal including a vehicle control unit, a head unit, a portable navigation device (PND), a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the device can support any type of interface to the user such as "wearable" circuitry, speech-control circuity, button/switch/dial circuitry, and/or the like.

In one embodiment, the vehicle sensor data that is presented in the user interface refers to sensor data collected about a vehicle and/or its context (e.g., location, movement, speed, acceleration, braking, lateral acceleration, etc.) as it operates while carrying a user as a passenger. In other words, the vehicle sensor data indicates at least one driving behavior of the vehicle while carrying a passenger. As the passenger profile platform 111 monitors and processes the vehicle sensor data collected from the vehicle, it can detect the individual driving behaviors (e.g., acceleration rate, braking rate, distance to neighboring vehicles, speed on curves, turning speed, obeying traffic lights/signs, etc.) and/or maneuvers (e.g., left/right turns, passing other vehicles, lane changes, etc.). The detected driving behaviors/maneuvers can then be presented to the user in a user interface.

Figure 10:
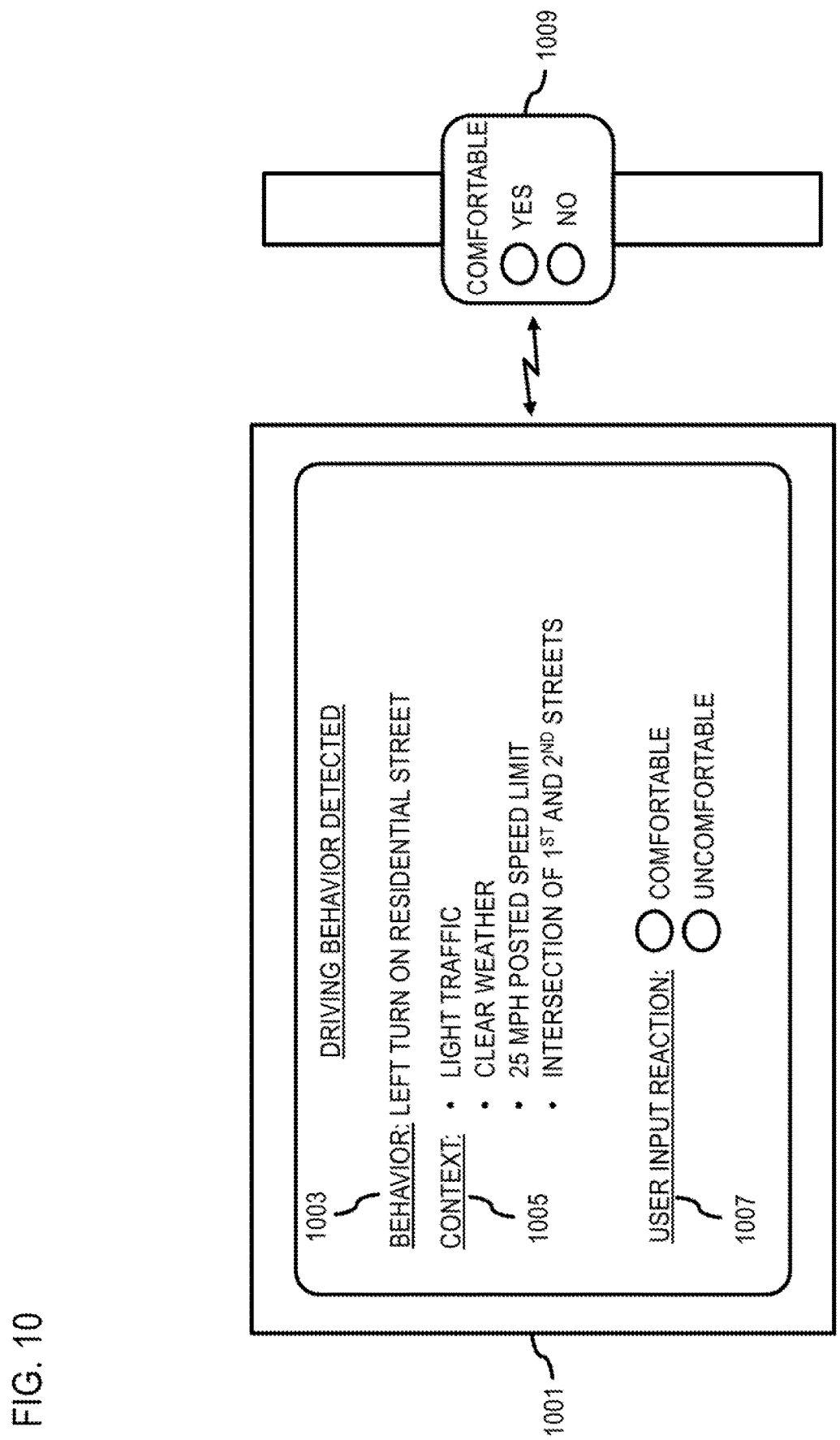
FIG. 10 is a diagram of example devices on which the user interface for collecting vehicle behavior and/or user reaction data can be presented, according to one embodiment.

FIG. 10 illustrates an example of a user interface (UI) 1001 for presenting detected driving behaviors, according to one embodiment. In the example of FIG. 10, the passenger profile platform 111 processes collected vehicle sensor data to detect that a monitored vehicle has made a left turn while carrying a user (e.g., shown as the driving behavior 1003 in the UI 1001). In one embodiment, the vehicle sensor data also either indicates or is fused with external data sources (e.g., map data) to indicate contextual parameters (e.g., collectively shown as context 1005) associated with the driving behavior 1003 such as the type of road link on which the driving behavior was detected (e.g., "residential street" queried from the geographic database 105), traffic conditions (e.g., "light traffic" determined from a traffic service such as any of the services 109$a$-109$n$ of the services platform 107), weather conditions (e.g., "clear weather" determined from a weather service such as any of the services 109$a$-109$n$ of the services platform 107), posted speed limit on road link (e.g., "25 MPH" as queried from the geographic database 105), and location (e.g., "Intersection of $1^{st}$ and $2^{nd}$ streets" queried from the geographic database 105).

In one embodiment, the UI 1001 can provide a UI element 1007 for the user to provide an input indicating the user's reaction to the detected driving behavior. In this example, the UI element 1007 provides toggle controls for indicating whether the user is comfortable or uncomfortable with the presented driving behavior 1003. In some embodiments, the UI element 1007 can be presented on a wearable device 1009 or other secondary device (e.g., a user's personal device) to receive the user input indicating a user reaction to the driving behavior while the user is a passenger. For example, the user input can indicate a comfort level, a discomfort level, or a combination thereof with the at least one driving behavior.

In addition or as alternate to explicit user input, the passenger profile platform 111 can automatically detect a user reaction to a corresponding driving behavior using collected user sensor data. As described above, the user sensor data are collected via one or sensors configured to monitor for user reactions. In one embodiment, the one or more sensors include but is not limited to a camera sensor configured to detect a facial movement, an eye movement, a body movement, or a combination thereof of the user that is indicative of the reaction. The body movement corresponds, for instance, to a driving-related motion performed by the user as the passenger. The one or more sensors can also include a heart rate sensor configured to detect a heart rate, a change in the heart rate, or a combination thereof of the user that is indicative of the reaction. In yet another embodiment, the one or more sensors can include a microphone in combination with a speech recognition module configured to sample a recognition speech or sound from the user that is indicative of the reaction. The one or more sensors can also include a touch sensor configured to detect a touch of a vehicle component by the user that is indicative of the reaction. The touch can be detected, for instance, as a grasping intensity of the user that is above a threshold value.

In step 903, the passenger profile platform 111 presents a UI element associated with the UI to receive a user input for providing, modifying, and/or interacting with the vehicle sensor data, the user sensor data, or a combination thereof. In other words, the passenger profile platform 111 can present a UI to convey any automatically detected driving behavior and/or user reaction data with respect to a vehicle carrying the user as a passenger, and provide means (e.g., the UI element) for the user to review, specify, correct, and/or otherwise edit the presented information.

Figure 11:
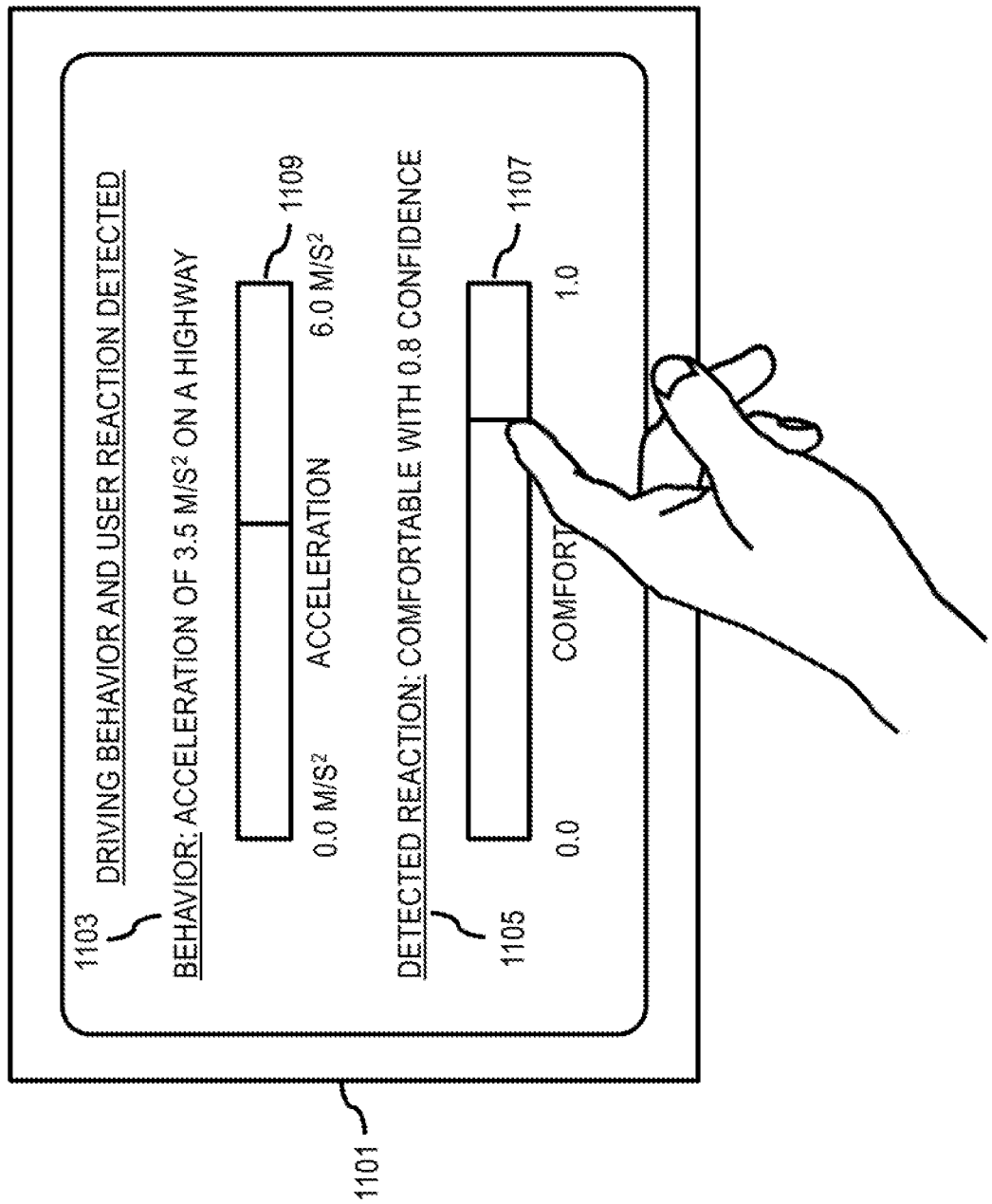
FIG. 11 is a diagram of an example user interface for collecting vehicle driving behavior and/or user reaction data, according to one embodiment.

FIG. 11 illustrates an example of a UI 1101 that presents detected driving behavior data 1103 in combination with automatically detected user reaction data 1105. As shown, the driving behavior 1103 is an acceleration rate of the vehicle on a highway (e.g., detected at 3.5 m/s$^2$ based, for instance, on vehicle sensor data) when carrying the user as a passenger. The passenger profile platform 111 has also detected the user's reaction based on collected user sensor data (e.g., heart rate data, detected facial expression, detected words or utterances, etc.). The user sensor data can be analyzed (e.g., using a trained machine learning model) to predict the user reaction or comfort level. In this example, the passenger profile platform 111 computes that user sensor data indicates that the user is comfortable with the detected driving behavior (e.g., the detected acceleration rate) with a 0.8 confidence (e.g., confidence output by the machine learning model). The passenger profile platform 111 can then generate and present a UI element 1107 as a representation of the detected reaction 1105 (e.g., a sliding scale representation with 0.8 marked using a line), and a UI element 1109 as a representation of the detected behavior 1103 (e.g., a slide scale representation with 3.5 m/s$^2$ marked using a line). Both the UI elements 1107 and 1109 are interactive elements that enable the user to change or modify the respective detected data values (e.g., by sliding the value lines to indicate a new value). For example, the user can interact with the user element 1107 to alter the comfort level from the initially detected value of 0.8 (e.g., by dragging to the right to indicate a higher confidence or comfort level, or dragging to the left to indicate a lower confidence or comfort level). The detected driving behavior (e.g., acceleration rate) can also be similarly modified.

In step 905, the passenger profile generator 305 generates a passenger profile for the user based on the vehicle sensor data, the user sensor, or a combination thereof after the providing, the modifying, the interacting with, or a combination of the vehicle sensor data, the user sensor data, or a combination thereof via the user interface element. For example, the passenger profile platform 111 can determine the provided or modified values for either the detected driving behavior or user reaction after the user's interaction with the presented UI. The passenger profile platform 111 then recomputes the passenger profile based on the updated values according to the embodiments described with respect to the process 400 of FIG. 4.

Figure 12:
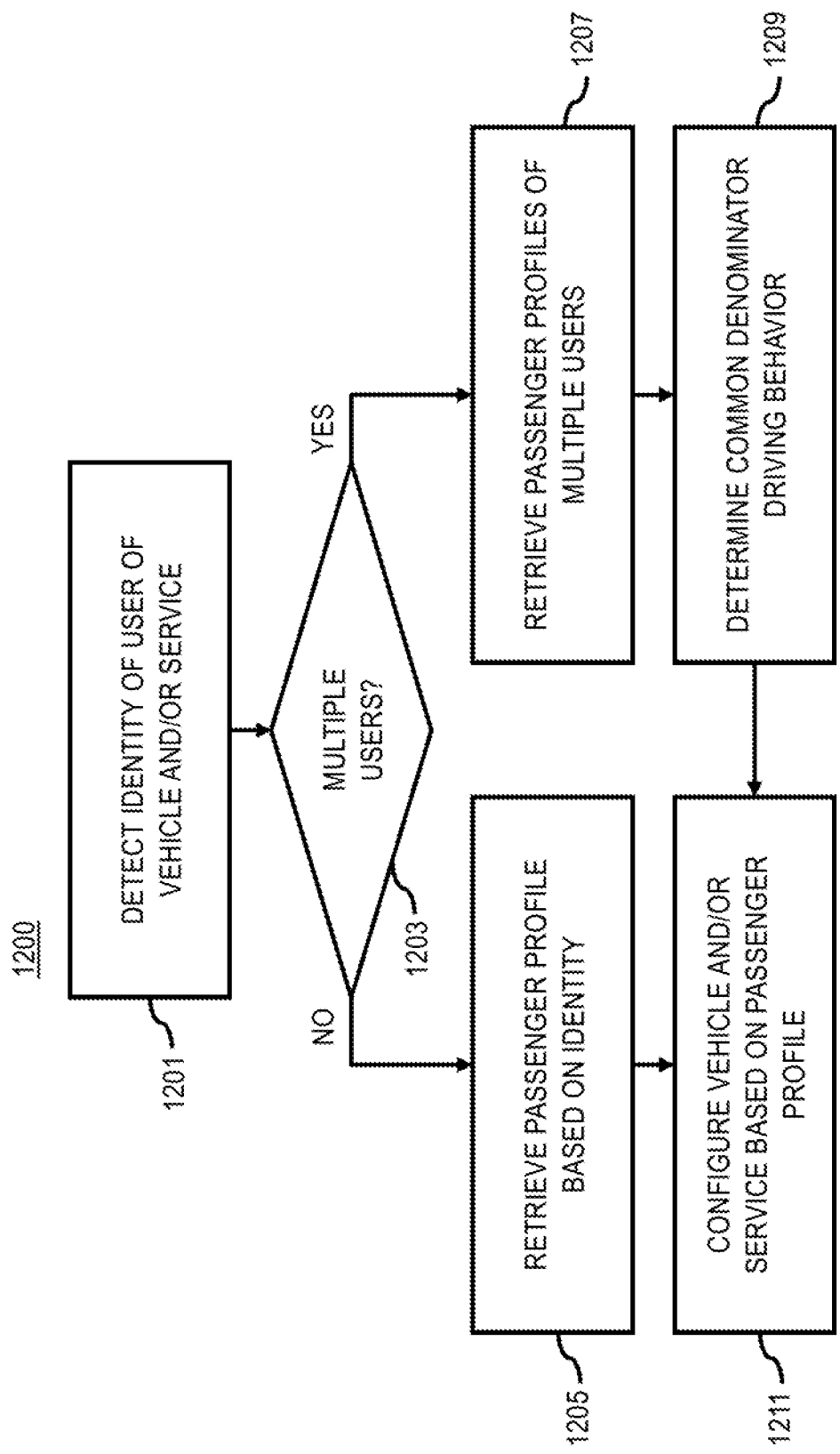
FIG. 12 is a flowchart of a process for using a passenger profile to configure a vehicle and/or service, according to one embodiment.

FIG. 12 is a flowchart of a process for using a passenger profile to configure a vehicle and/or service, according to one embodiment. In various embodiments, the passenger profile platform 111, passenger profile module 113, and/or any of the modules 301-309 may perform one or more portions of the process 1200 and may be implemented in, for instance, a chip set including a processor and a memory as shown in FIG. 19. As such, the passenger profile platform 111, passenger profile module 113, and/or any of the modules 301-309 can provide means for accomplishing various parts of the process 1200, as well as means for accomplishing embodiments of other processes described herein in conjunction with other components of the system 100. Although the process 1200 is illustrated and described as a sequence of steps, its contemplated that various embodiments of the process 1200 may be performed in any order or combination and need not include all of the illustrated steps.

After creating passenger profiles as described above, the system 100 can use the stored profiles for any number purposes including but not limited to configuring a vehicle or service to operate or function according to the preferences indicated in the passenger profiles. In one embodiment, to initiate this use, the vehicle configuration module 307 detects an identity of a user of a vehicle and/or service, as well as any other passengers or co-users of the service (step 1201). The passenger profile platform 111 can us any means to detect the identity of user and/or other passengers including but not limited to manual user input (e.g., entering user credentials or account information)) and/or automated means (e.g., biometric detection, face recognition, voice recognition, etc.).

In step 1203, the vehicle configuration module 307 can determine whether the vehicle is carrying one or more other passengers in addition to the user. If there are no other passengers, the vehicle configuration module 307 proceeds to step 1205 to initiate single user processing. More specifically, the vehicle configuration module 307 retrieves a passenger profile of the user based on the determined identity of the user. In one embodiment, the passenger profile is generated based on sensor data indicating a reaction of the user to at least one vehicle driving behavior previously experienced by the user as a vehicle passenger. Embodiments of the process for generating passenger profiles is described in more detail above with respect to the process 400 of FIG. 4.

If the vehicle configuration module 307 detects that there are multiple passengers in the vehicle in step 1203, the vehicle configuration module 307 proceeds to step 1207 to initiate multiple passenger processing by retrieving passenger profiles for the one or more other passengers in addition to the detected user's profile. In step 1209, the vehicle configuration module 307 determines a common denominator driving behavior from among the passenger profile and the one or more other passenger profiles. As used herein, a common denominator driving behavior is a driving behavior that is comfortable to the multiple passengers based on their respective passenger profiles. For example, if the passenger profile platform 111 detects that there are three passengers in a vehicle, with the one passenger comfortable with a maximum speed of 45 mph, a second passenger with a maximum speed of 55 mph, and a third passenger comfortable with a maximum speed of 35 mph, the common denominator driving behavior is 35 mph. The common denominator driving behavior can be determined with respect to all passengers or a subset of the passengers. In cases where no common denominator driving behavior can be determined (e.g., when one passenger profile indicates that a passenger is only comfortable with speeds over 45 mph, and another passenger's profile indicates the other passenger is only comfortable with speeds below 45 mph), the passenger profile can alert the passengers and of the incompatibility. In some embodiments, the passenger profile platform 111 can recommend alternate passenger groupings or alternate transportation means to resolve the incompatibility.

After retrieving the passenger profile or profiles, the vehicle configuration module 307 configures the vehicle and/or service based on the single user passenger profile or the multiple user profiles (e.g., the common denominator driving behavior) (step 1211). In one embodiment, the configuring of the vehicle comprises adapting a driving style of a vehicle based on the passenger profile. For example, adapting the driving style of the vehicle comprises configuring the vehicle to operate using the preferred driving parameters (e.g., acceleration, braking, distance to other vehicles, speed on curves, turning speeds, acceptable maneuvers, etc.) indicated in the retrieved passenger profile data. In an autonomous vehicle use case, the driving style is adapted when the vehicle is operating in an autonomous driving mode. In the autonomous use case, the vehicles autonomous control and navigation system can be configured using the passenger profile to use a driving style that is comfortable to the user and/or avoid any driving behaviors that are uncomfortable to the user. In another use case where the vehicle is a ride-share vehicle or other vehicle driven by a human driver other than the user or passengers evaluated by the passenger profile platform 111, the vehicle configuration module 307 can present or provide data for presenting a user interface to the driver of the ride-share vehicle to indicate a driving style preferred by the user based on the passenger profile.

Figure 13:
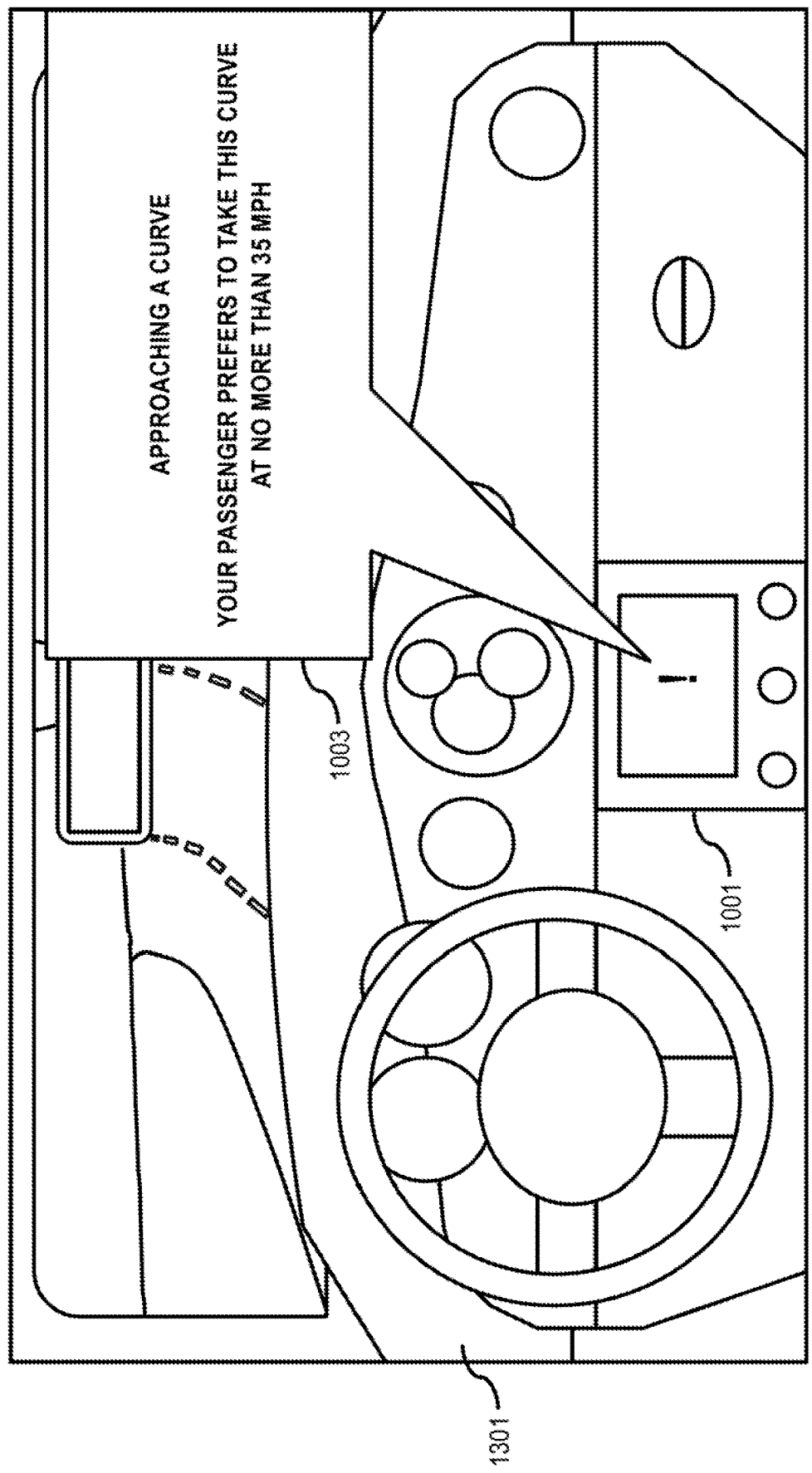
FIG. 13 is an example of using a passenger profile to adapt a driving style of a vehicle, according to one embodiment.

FIG. 13 is an example of using a passenger profile to adapt a driving style of a vehicle, according to one embodiment. In the example of FIG. 13, the vehicle 1301 is a ride-share vehicle operated by a driver and carrying a user as a passenger. The passenger profile platform 111 identifies the user as the passenger and retrieves the user passenger profile. As the vehicle drives, the passenger profile platform 111 monitors for potential driving behaviors that are covered or included in the user's passenger profile. As shown, the passenger profile platform 111 detects that the vehicle 1301 is approaching a curve and determines that the user's passenger profile indicates that the user is comfortable with a maximum speed of 35 mph on such curves. Accordingly, the passenger profile platform 111 initiates or provide data for the vehicle 1301 to present an alert 1303 to the driver of the vehicle 1301 that the vehicle 1301 is approaching a curve and that the "passenger prefers to take this curve at no more than 35 mph."

It is noted that configuration the operational parameters of a vehicle (e.g., configuring the acceleration, braking, speed, etc.) is only one example of configuring a vehicle based on a passenger profile. In other embodiments, the configuring of the vehicle comprises selecting a driver for the vehicle based on the passenger profile. For example, the passenger profile of the user can be matched against the driving profiles of candidate drivers to find the compatible driving behaviors (e.g., driving behaviors of the candidate drivers that are associated with a positive or comfortable reaction in the passenger profile).

In another embodiment, the configuring of the vehicle can comprise computing a navigation route for the vehicle based on the passenger profile. For example, the passenger profile platform 111 can provide passenger profile data to a vehicle navigation system so that road links or routes associated driving behaviors or maneuvers that have a positive user reaction can be favored while the road links or routes associated with driving behaviors or maneuvers that have a negative user reaction can reduced or deprioritized. For example, if a passenger profile indicates that a user is uncomfortable with making left turns in heavy traffic, the passenger profile platform 111 can interact with the navigation to configure the vehicle to avoid routes with left turns when traffic is heavy.

In one embodiment, the routing based on the comfort levels can also be linked with an estimated time of arrival (ETA) or other user navigation preference or option. For example, if the system 100 generates a route that meets the user's desired comfort level but the route would result in an increased ETA that conflicts with a user's scheduled appointment, the system 100 can provide data or a user interface to inform the user that the user will not be on time for the appointment if the system 100 respects the user's comfort level for the entire route. In response, the system 100 can present the user with a user interface to select whether the user prefers being a bit late (e.g., arriving at the destination after the scheduled appointment time) or accepting at least a portion of the route that does not meet the user's determined comfort level. In one embodiment, the user interface for selecting the option can also present alternate routes for user selection. For example, a first route may be generated and presented in which the travel time is 50 minutes with maximum comfort level, a second route may be generated and presented with a travel time of 42 minutes with minimum but acceptable comfort level, a third route may be generated and presented with the fastest travel time of 38 min but with 50% of the route not meeting the user's minimum comfort level, etc.

In yet another embodiment, the configuration of the vehicle can comprise determining a vehicle seating position for the user based on the passenger profile. For example, the passenger profile may include seating position as one contextual parameter in the passenger profile. This is because seating position can potentially have an effect on the comfort level or discomfort level of a user with the same driving behavior. For example, a user may be comfortable with closer following distances when sitting in the back seat because the user may not be able to see the next vehicle as clearly as when sitting one of the front seats. Similarly, sitting in the driver position as a passenger (e.g., when the vehicle is operating autonomously) may provide different comfort levels than when sitting in the front passenger seat. Accordingly, in one embodiment, the passenger profile platform 111 can recommend different seating positions to optimize compatibility with other passenger profiles to achieve a target level of driving performance (e.g., recommend the user sit in the back seat, so that the vehicle can be operated higher speeds to reach a destination at a requested time).

In addition to configuring a vehicle, the passenger profile can also be used to configure services for which passenger profile data is relevant. An example of such a service includes but is not limited to ride-sharing services, car recommendation services, etc. In one embodiment, the configuring of a service includes selecting options, parameters, actions, functions, etc. of the service based on the retrieved passenger profile data. For example, in a ride-sharing service, the service interface 309 (e.g., an application programming interface (API) or equivalent) can provide the passenger profile data to the ride-sharing service to select one or more other passengers to group with the user in a vehicle. The selection of the other passengers can be based, for instance, on a similarity of the passenger profile and one or more other passenger profiles of the one or more other passengers. The similarity can be based on finding on ability to find common denominator driving behaviors among the passenger profiles.

Figure 14:
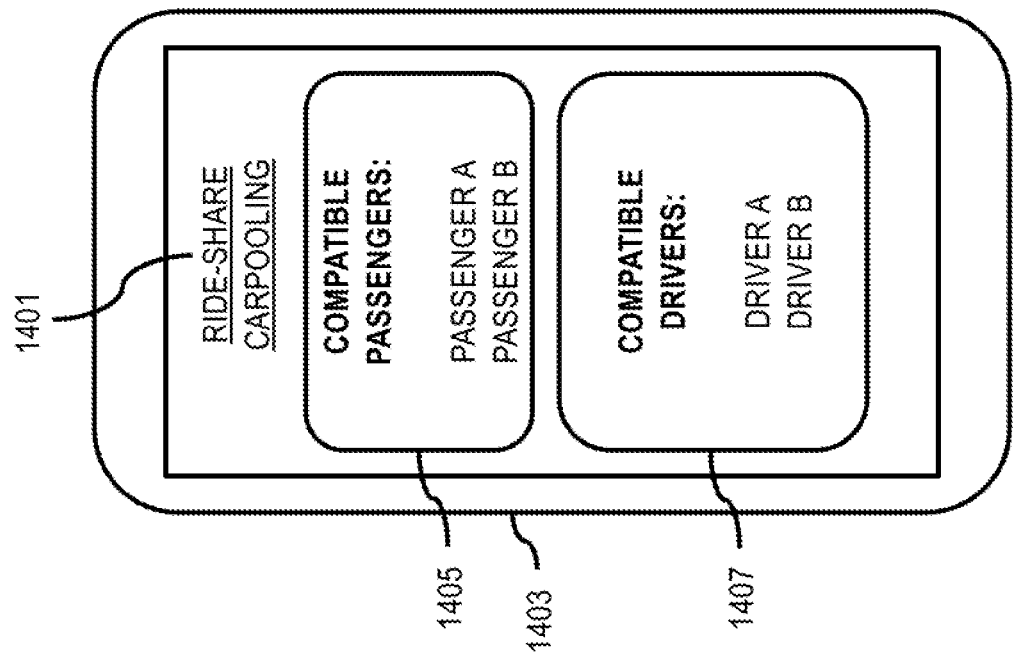
FIG. 14 is an example of using a passenger profile to configure a vehicle-related service, according to one embodiment.

FIG. 14 is an example of using a passenger profile to configure a vehicle-related service (e.g., a ride-share service), according to one embodiment. In the example of FIG. 14, a user initiates a ride-share application 1401 on a device 1403, and requests a carpooling ride that is shared among multiple users. The ride-share application 1401 can interact with the service interface 309 of the passenger profile platform 111 to identify the user (e.g., via a login using the ride-share application 1401) and retrieve the user's passenger profile. The passenger profile can then be matched against other potential passengers requesting carpool rides at the same time. The passengers whose passenger profiles are most compatible with the user's passenger profile (e.g., passengers who prefer or are comfortable with similar driving behaviors as indicated in their respective profiles) are then presented in the UI element 1405. In one embodiment, the ride-share application 1401 can also interact with the passenger profile platform 111 to determine available ride-share drivers who are also compatible with the user and the other identified potential co-passengers. The compatible drivers are those driver's whose driving profiles (e.g., recorded driving behaviors) indicate driving behaviors or maneuvers that are associated with positive user reactions as indicated in the user's passenger profiles. In one embodiment, the passenger profiles of the user and any other candidate passengers can be processed to determine a common denominator driving profile or behavior comfortable to all or a subset of the passengers. This common denominator driving profile can then be compared against the driving profiles of candidate drivers to select or recommend compatible drivers. In the example of FIG. 14, the compatible drivers are shown in the UI element 1407.

It is noted that ride-sharing is only one type of service or application that can use the passenger profiles generated according to the embodiments described herein. It is contemplated that any type of service or application can interface with the passenger profile platform 111 to obtain passenger profile data. For example, another type of service is a car recommendation as described below.

Figure 15:
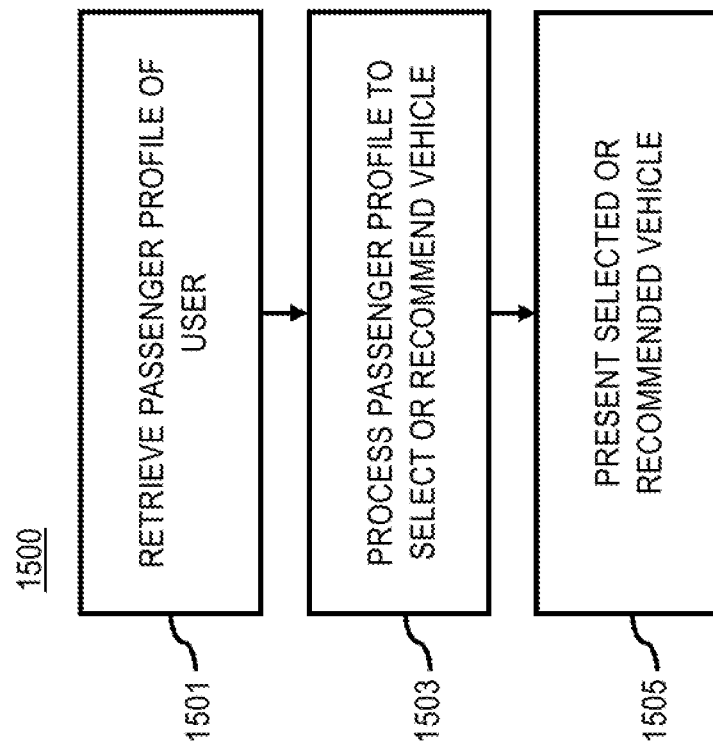
FIG. 15 is a flowchart of a process for selecting or recommending a vehicle or other vehicle related item based on a passenger profile, according to one embodiment.

FIG. 15 is a flowchart of a process for selecting or recommending a vehicle or other vehicle related item based on a passenger profile, according to one embodiment. In various embodiments, the passenger profile platform 111, passenger profile module 113, and/or any of the modules 301-309 may perform one or more portions of the process 1500 and may be implemented in, for instance, a chip set including a processor and a memory as shown in FIG. 19. As such, the passenger profile platform 111, passenger profile module 113, and/or any of the modules 301-309 can provide means for accomplishing various parts of the process 1500, as well as means for accomplishing embodiments of other processes described herein in conjunction with other components of the system 100. Although the process 1500 is illustrated and described as a sequence of steps, its contemplated that various embodiments of the process 1500 may be performed in any order or combination and need not include all of the illustrated steps.

In step 1501, the service interface 309 retrieves a passenger profile of a user. As described above, the passenger profile is generated based on sensor data indicating a reaction of the user to at least one vehicle driving behavior previously experienced by the user as a vehicle passenger.

In step 1503, the service interface 309 processes the passenger profile to select or to recommend a vehicle to the user. In one embodiment, the vehicle is selected from a plurality of vehicles by comparing the passenger profile against vehicle capability data of a plurality of vehicles. As described above, in one embodiment, the passenger profile includes an acceleration pattern, a braking pattern, a distance to a neighboring vehicle, a vehicle speed on a curved section, or a combination thereof preferred by the user. The vehicle capability data can include but is not limited to a horse power level, an acceleration capability, a braking capability, a lateral acceleration capability, or a combination thereof. The vehicle capability data, for instance, can be determined or queried from the services platform 107, any of the services 109*a*-109*n* of the services platform 107, the content providers 117*a*-123*m*, and/or any other equivalent data source.

The vehicle capability data can then be compared against the acceleration pattern, the braking pattern, the distance to a neighboring vehicle, the vehicle speed on the curved section, and/or any other driving behaviors/parameters stored in the user's passenger profile to select or to recommend the vehicle. In this way, the vehicle that is selected or recommended has the vehicle capability data that indicates the vehicle can achieve the acceleration pattern, the braking pattern, the distance to the neighboring vehicle, the vehicle speed on the curved section, or a combination thereof in the passenger profile with a minimum of excess vehicle capability among the plurality of vehicles.

In one embodiment, the user can specify additional criteria for selecting a vehicle including but not limited to brand, price, model (e.g., coupe, sedan, SUV, truck, etc.), features/equipment (e.g., seating material, options, etc.). These additional criteria can then be further considered when making a vehicle selection or recommendation. For example, if the user's passenger profile includes a contextual parameter that indicates the user prefers a particular brand or make of vehicle, the passenger profile platform 111 can make a selection or recommendation from among the models offered by the brand or make. If no vehicles are compatible with the passenger profile (e.g., vehicles have capabilities capable of achieving the driving behavior or maneuvers preferred by the user), then models for other makes can be next considered. Similarly, if the user specifies a maximum price, then the passenger profile platform 111 can select the cars that are compatible with the user's passenger profile that are below the maximum price. In another example, the user may request the least expensive car compatible with the user's passenger profile, and the passenger profile platform 111 can make the selection or recommendation accordingly.

In one embodiment, the service interface 309 of the passenger profile platform 111 can select or recommend multiple vehicles from among the plurality of vehicles based on determining that a single vehicle from among the plurality of vehicles is not capable of achieving the acceleration pattern, the braking pattern, the distance to the neighboring vehicle, the vehicle speed on the curved section, and/or other driving behaviors in the passenger profile. For example, the user passenger profile may indicate that the user prefers to less aggressive driving style when operating in urban environments, but then prefers more aggressive high-speed travel on rural highways. The passenger profile platform 111 may determine that a single is not able to achieve the preferred urban driving style and the preferred high-speed driving style in rural areas within the budget constraints of the user. As a result, the service interface 309 can recommend to the car recommendation service or application one car for urban driving and another car for rural driving, with both cars being within the user's budget constraint (if any).

In one embodiment, if no single car can achieve the preferred driving style indicated in the user's passenger profile, the service interface 309 can deprioritize at least one of the acceleration pattern, the braking pattern, the distance to the neighboring vehicle, the vehicle speed on the curved section, and/or other driving behavior in the passenger profile for selecting or recommending the vehicle. The deprioritization can be performed according to a default order or sequence (e.g., acceleration first, braking second, etc.) until a car can recommended. Alternatively, the user can specify a preferred deprioritization order. In one embodiment, deprioritization comprises decreasing the weight applied to the corresponding driving behavior, eliminating the driving behavior, increasing window for determining when a vehicle capability satisfies a driving behavior (e.g., if a preferred acceleration rate is 3.5 m/s$^2$ the matching window can be expanded from +/−10% to +/−20%, and/or the like).

In one embodiment, the vehicle is further selected based on contextual data associated with the user, the vehicle, an expected route, a trip objective, or a combination thereof. For example, contextual parameters about the user can include but are not limited to height or stature, family size, degree of mobility, disabilities, etc. Contextual parameters about the vehicle can include but are not limited to brand, color, fuel efficiency, options, etc. Contextual parameters about the expected route can include but are not limited to functional class of road links on the route, speed limits on the route, road type (e.g., paved streets, off-road, etc.), urban vs. rural, etc. Contextual parameters about the trip objective include but are not limited to destination (e.g., work, home), planned activity (e.g., shopping, tourism, work, etc.). The contextual parameters described herein a provided by way of illustration and not as limitations.

Figure 16:
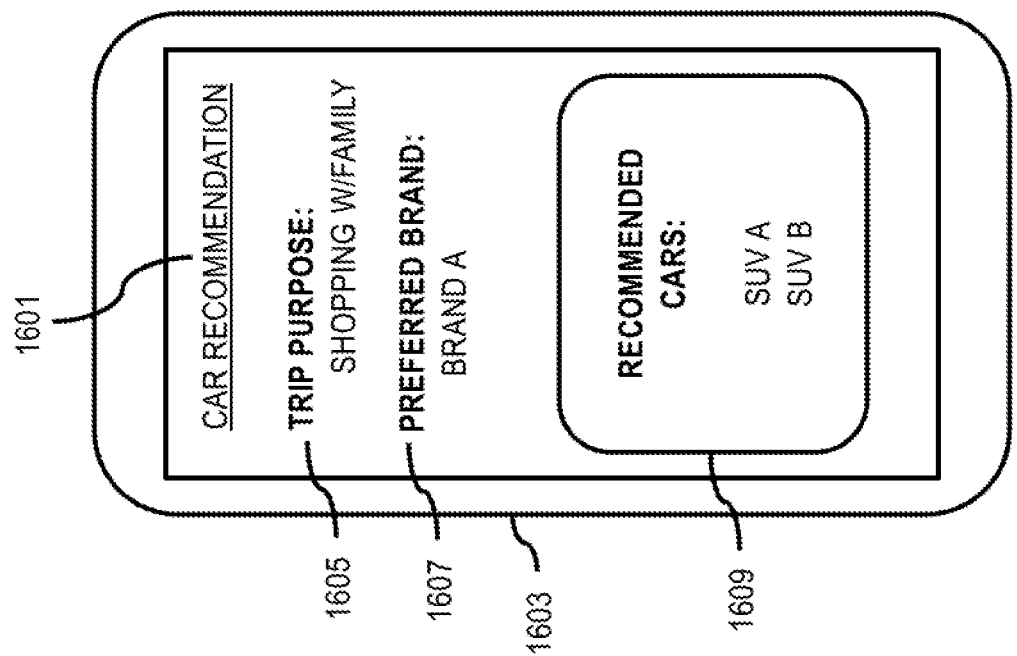
FIG. 16 is a diagram of an example user interface for presenting vehicles selected or recommended based on a passenger profile, according to one embodiment.

In step 1503, the service interface presents or provides data for presenting the vehicle in a user interface of a device of the user. For example, as shown in the example of FIG. 16, a user is requesting a car recommendation 1601 from a service via a user device 1603. The user also specified contextual information (e.g., a trip purpose 605—"Shopping with Family" and a preferred car brand—"Brand A") for the recommendation 1601. Based on the request, the service (e.g., a ride-share service, car buying service, etc.) retrieves the user's passenger profile and vehicle capability information for vehicles available from the specified brand. The cars that are compatible with the passenger profile and the contextual information is then determined according to the embodiments described herein and presented in the UI element 1609 (e.g., listing recommended vehicles SUV A and SUV B). The user can then select a vehicle from the UI element 1609. In one embodiment, the vehicle that is selected or recommended can then be configured to operate using the passenger profile and/or specified contextual information (e.g., according to the process 1200 of FIG. 12 described above).

Returning to FIG. 1, in one embodiment, the passenger profile platform 111 has connectivity over a communication network 115 to the services platform 107 (e.g., an OEM platform) that provides one or more services 109 (e.g., sensor data collection services). By way of example, the services 109 may also be other third-party services and include ride-share services, vehicle recommendation services, gaming services, mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 107 uses the output of the passenger profile platform 111 (e.g., passenger profile data) to provide various services and/or applications. In other embodiments, the services platform 107 and/or services 109 can provide contextual or other information for generating passenger profiles according to the various embodiments described herein.

In one embodiment, the passenger profile platform 111 may be a platform with multiple interconnected components, and may include multiple servers, intelligent networking devices, computing devices, components and corresponding software for generating passenger profiles. In addition, it is noted that the passenger profile platform 111 may be a separate entity of the system 100, a part of the one or more services 109, a part of the services platform 107, or included within the vehicle 101 (e.g., a passenger profile module 113).

In one embodiment, content providers 117a-117m (collectively referred to as content providers 117) may provide content or data (e.g., including geographic data, contextual data, vehicle capability data, etc.) to the geographic database 105, the passenger profile platform 111, the services platform 107, the services 109, and/or the vehicle 101. The content provided may be any type of content, such as map content, textual content, audio content, video content, image content, etc. In one embodiment, the content providers 117 may provide content that may aid in the detecting and classifying of VRUs or other related characteristics (e.g., physical dividers). In one embodiment, the content providers 117 may also store content associated with the geographic database 105, passenger profile platform 111, services platform 107, services 109, and/or vehicle 101. In another embodiment, the content providers 117 may manage access to a central repository of data, and offer a consistent, standard interface to data, such as a repository of the geographic database 105.

By way of example, the passenger profile module 113 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the passenger profile module 113 can support any type of interface to the user (such as "wearable" circuitry, etc.). In one embodiment, the Passenger profile module 113 may be associated with the vehicle 101 or be a component part of the vehicle 101.

In one embodiment, the vehicle 101 is configured with various sensors for generating or collecting vehicular sensor data indicating driving behavior, user sensor data indicating user reactions to driving behaviors, related contextual data, geographic/map data, etc. In one embodiment, the sensed data represent sensor data associated with a geographic location or coordinates at which the sensor data was collected. In this way, the sensor data can be map matched to a street network or digital map of the geographic database 105. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 101 may detect the relative distance of the vehicle to a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the passenger profile platform 111, services platform 107, services 109, vehicle 101, and/or content providers 117 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 17:
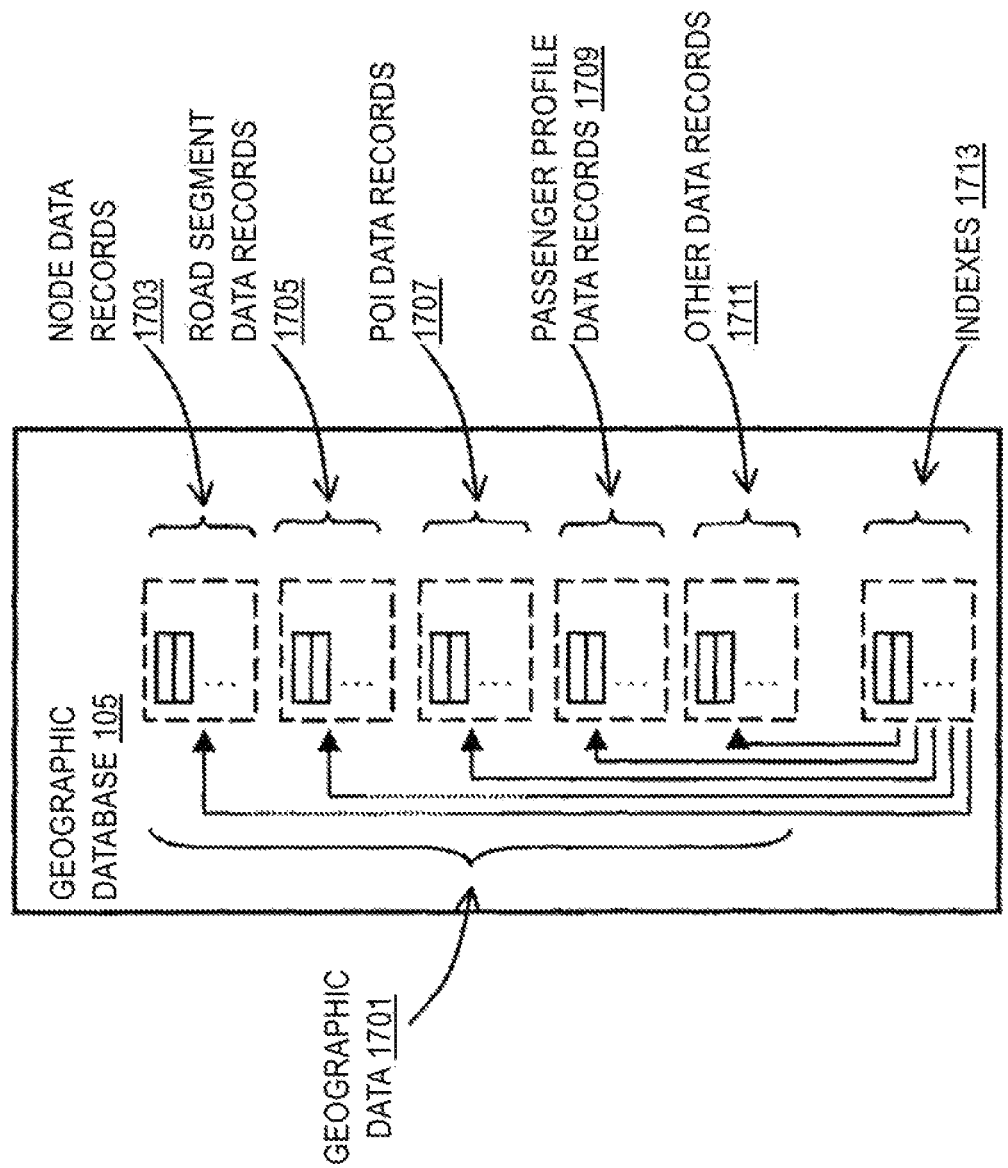
FIG. 17 is a diagram of a geographic database, according to one embodiment.

FIG. 17 is a diagram of a geographic database, according to one embodiment. In one embodiment, the geographic database 105 includes geographic data 1701 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 105.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 105 follows certain conventions. For example, links do not cross themselves and do not cross each other except at a node. Also, there are no duplicated shape points, nodes, or links. Two links that connect each other have a common node. In the geographic database 105, overlapping geographic features are represented by overlapping polygons. When polygons overlap, the boundary of one polygon crosses the boundary of the other polygon. In the geographic database 105, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 105 includes node data records 1703, road segment or link data records 1705, POI data records 1707, passenger profile data records 1709, other records 1711, and indexes 1713, for example. More, fewer or different data records can be provided. In one embodiment, additional data records (not shown) can include cartographic ("carto") data records, routing data, and maneuver data. In one embodiment, the indexes 1713 may improve the speed of data retrieval operations in the geographic database 105. In one embodiment, the indexes 1713 may be used to quickly locate data without having to search every row in the geographic database 105 every time it is accessed. For example, in one embodiment, the indexes 1713 can be a spatial index of the polygon points associated with stored feature polygons.

In exemplary embodiments, the road segment data records 1705 are links or segments representing roads, streets, or paths, as can be used in the calculated route or recorded route information for determination of one or more personalized routes. The node data records 1703 are end points corresponding to the respective links or segments of the road segment data records 1705. The road link data records 1705 and the node data records 1703 represent a road network, such as used by vehicles, cars, and/or other entities. Alternatively, the geographic database 105 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 105 can include data about the POIs and their respective locations in the POI data records 1707. The geographic database 105 can also include data about places, such as cities, towns, or other communities, and other geographic features, such as bodies of water, mountain ranges, etc. Such place or feature data can be part of the POI data records 1707 or can be associated with POIs or POI data records 1707 (such as a data point used for displaying or representing a position of a city).

In one embodiment, the geographic database 105 can also include passenger profile records 1709 for storing passenger profiles and related data generated for one or more users. The passenger profile data records 1709 can also include collected vehicle sensor data, user sensor data, detected driving behaviors, associated user reactions (e.g., comfort level, discomfort level). In one embodiment, the passenger profile data records 1709 and/or the detected driving behaviors and passenger reactions can be associated with segments of a road link (as opposed to an entire link). It is noted that the segmentation of the road for the purposes of detecting driving behaviors and/or reactions data can be different than the street network or road link structure of the geographic database 105. In other words, the segments can further subdivide the links of the geographic database 105 into smaller segments (e.g., of uniform lengths such as 5-meters). In this way, the driving behaviors included in the passenger profiles can be represented at a level of granularity that is independent of the granularity or at which the actual road or road network is represented in the geographic database 105. In one embodiment, the passenger profile data records 1709 can be associated with one or more of the node records 1703, road segment records 1705, and/or POI data records 1707; or portions thereof (e.g., smaller or different segments than indicated in the road segment records 1705, individual lanes of the road segments, etc.) to generate passenger profile data for autonomous operation and routing of vehicles.

In one embodiment, the geographic database 105 can be maintained by the content provider 117 in association with the services platform 107 (e.g., a map developer). The map developer can collect geographic data to generate and enhance the geographic database 105. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., VRU attributes, VRU patterns, etc.) and/or record information about them, for example. Also, remote sensing, such as aerial or satellite photography, can be used.

In one embodiment, the geographic database 105 include high resolution or high definition (HD) mapping data that provide centimeter-level or better accuracy of map features.

For example, the geographic database 105 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 105 is stored as a hierarchical or multi-level tile-based projection or structure. More specifically, in one embodiment, the geographic database 105 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 105 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for generating a passenger-based driving profile may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 18:
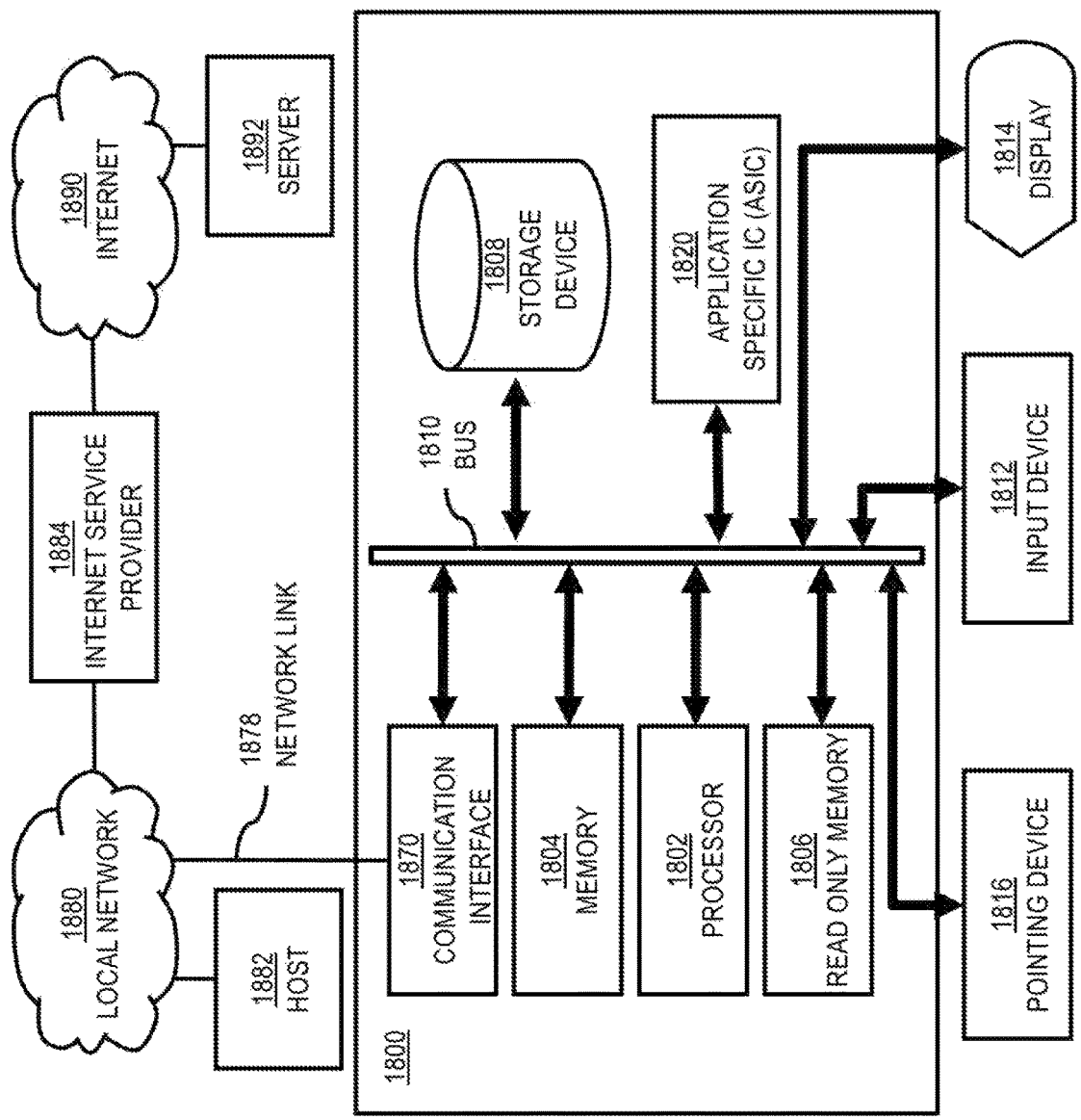
FIG. 18 is a diagram of hardware that can be used to implement an embodiment.

FIG. 18 illustrates a computer system 1800 upon which an embodiment of the invention may be implemented. Computer system 1800 is programmed (e.g., via computer program code or instructions) to generate a passenger-based driving profile as described herein and includes a communication mechanism such as a bus 1810 for passing information between other internal and external components of the computer system 1800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1810 includes one or more parallel conductors of information so that information is transferred quickly among devices coupled to the bus 1810. One or more processors 1802 for processing information are coupled with the bus 1810.

A processor 1802 performs a set of operations on information as specified by computer program code related to generating a passenger-based driving profile. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus

1810 and placing information on the bus 1810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1800 also includes a memory 1804 coupled to bus 1810. The memory 1804, such as a random access memory (RAM) or other dynamic storage device, stores information including processor instructions for generating a passenger-based driving profile. Dynamic memory allows information stored therein to be changed by the computer system 1800. RAM allows a unit of information stored at a location called a memory address to be stored and retrieved independently of information at neighboring addresses. The memory 1804 is also used by the processor 1802 to store temporary values during execution of processor instructions. The computer system 1800 also includes a read only memory (ROM) 1806 or other static storage device coupled to the bus 1810 for storing static information, including instructions, that is not changed by the computer system 1800. Some memory is composed of volatile storage that loses the information stored thereon when power is lost. Also coupled to bus 1810 is a non-volatile (persistent) storage device 1808, such as a magnetic disk, optical disk or flash card, for storing information, including instructions, that persists even when the computer system 1800 is turned off or otherwise loses power.

Information, including instructions for generating a passenger-based driving profile, is provided to the bus 1810 for use by the processor from an external input device 1812, such as a keyboard containing alphanumeric keys operated by a human user, or a sensor. A sensor detects conditions in its vicinity and transforms those detections into physical expression compatible with the measurable phenomenon used to represent information in computer system 1800. Other external devices coupled to bus 1810, used primarily for interacting with humans, include a display device 1814, such as a cathode ray tube (CRT) or a liquid crystal display (LCD), or plasma screen or printer for presenting text or images, and a pointing device 1816, such as a mouse or a trackball or cursor direction keys, or motion sensor, for controlling a position of a small cursor image presented on the display 1814 and issuing commands associated with graphical elements presented on the display 1814. In some embodiments, for example, in embodiments in which the computer system 1800 performs all functions automatically without human input, one or more of external input device 1812, display device 1814 and pointing device 1816 is omitted.

In the illustrated embodiment, special purpose hardware, such as an application specific integrated circuit (ASIC) 1820, is coupled to bus 1810. The special purpose hardware is configured to perform operations not performed by processor 1802 quickly enough for special purposes. Examples of application specific ICs include graphics accelerator cards for generating images for display 1814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1800 also includes one or more instances of a communications interface 1870 coupled to bus 1810. Communication interface 1870 provides a one-way or two-way communication coupling to a variety of external devices that operate with their own processors, such as printers, scanners and external disks. In general the coupling is with a network link 1878 that is connected to a local network 1880 to which a variety of external devices with their own processors are connected. For example, communication interface 1870 may be a parallel port or a serial port or a universal serial bus (USB) port on a personal computer. In some embodiments, communications interface 1870 is an integrated services digital network (ISDN) card or a digital subscriber line (DSL) card or a telephone modem that provides an information communication connection to a corresponding type of telephone line. In some embodiments, a communication interface 1870 is a cable modem that converts signals on bus 1810 into signals for a communication connection over a coaxial cable or into optical signals for a communication connection over a fiber optic cable. As another example, communications interface 1870 may be a local area network (LAN) card to provide a data communication connection to a compatible LAN, such as Ethernet. Wireless links may also be implemented. For wireless links, the communications interface 1870 sends or receives or both sends and receives electrical, acoustic or electromagnetic signals, including infrared and optical signals, that carry information streams, such as digital data. For example, in wireless handheld devices, such as mobile telephones like cell phones, the communications interface 1870 includes a radio band electromagnetic transmitter and receiver called a radio transceiver. In certain embodiments, the communications interface 1870 enables connection to the communication network 115 for generating a passenger-based driving profile.

The term computer-readable medium is used herein to refer to any medium that participates in providing information to processor 1802, including instructions for execution. Such a medium may take many forms, including, but not limited to, non-volatile media, volatile media and transmission media. Non-volatile media include, for example, optical or magnetic disks, such as storage device 1808. Volatile media include, for example, dynamic memory 1804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 19 illustrates a chip set 1900 upon which an embodiment of the invention may be implemented. Chip set 1900 is programmed to generate a passenger-based driving profile as described herein and includes, for instance, the processor and memory components described with respect to FIG. 18 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1900 includes a communication mechanism such as a bus 1901 for passing information among the components of the chip set 1900. A processor 1903 has connectivity to the bus 1901 to execute instructions and process information stored in, for example, a memory 1905. The processor 1903 may include one or more processing cores with each core configured to perform independently. A multi-core processor enables multiprocessing within a single physical package. Examples of a multi-core processor include two, four, eight, or greater numbers of processing cores. Alternatively or in addition, the processor 1903 may include one or more microprocessors configured in tandem via the bus 1901 to enable independent execution of instructions, pipelining, and multithreading. The processor 1903 may also be accompanied with one or more specialized components to perform certain processing functions and tasks such as one or more digital signal processors (DSP) 1907, or one or more application-specific integrated circuits (ASIC) 1909. A DSP 1907 typically is configured to process real-world signals (e.g., sound) in real time independently of the processor 1903. Similarly, an ASIC 1909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1903 and accompanying components have connectivity to the memory 1905 via the bus 1901. The memory 1905 includes both dynamic memory (e.g., RAM, magnetic disk, writable optical disk, etc.) and static memory (e.g., ROM, CD-ROM, etc.) for storing executable instructions that when executed perform the inventive steps described herein to generate a passenger-based driving profile. The memory 1905 also stores the data associated with or generated by the execution of the inventive steps.

FIG. 20 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 2003, a Digital Signal Processor (DSP) 2005, and a receiver/transmitter unit including a microphone gain control unit and a speaker gain control unit. A main display unit 2007 provides a display to the user in support of various applications and mobile station functions that offer automatic contact matching. An audio function circuitry 2009 includes a microphone 2011 and microphone amplifier that amplifies the speech signal output from the microphone 2011. The amplified speech signal output from the microphone 2011 is fed to a coder/decoder (CODEC) 2013.

A radio section 2015 amplifies power and converts frequency in order to communicate with a base station, which is included in a mobile communication system, via antenna 2017. The power amplifier (PA) 2019 and the transmitter/modulation circuitry are operationally responsive to the MCU 2003, with an output from the PA 2019 coupled to the duplexer 2021 or circulator or antenna switch, as known in the art. The PA 2019 also couples to a battery interface and power control unit 2020.

In use, a user of mobile station 2001 speaks into the microphone 2011 and his or her voice along with any detected background noise is converted into an analog voltage. The analog voltage is then converted into a digital signal through the Analog to Digital Converter (ADC) 2023. The control unit 2003 routes the digital signal into the DSP 2005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 2025 for compensation of any frequency-dependent impairments that occur during transmission though the air such as phase and amplitude distortion. After equalizing the bit stream, the modulator 2027 combines the signal with a RF signal generated in the RF interface 2029. The modulator 2027 generates a sine wave by way of frequency or phase modulation. In order to prepare the signal for transmission, an up-converter 2031 combines the sine wave output from the modulator 2027 with another sine wave generated by a synthesizer 2033 to achieve the desired frequency of transmission. The signal is then sent through a PA 2019 to increase the signal to an appropriate power level. In practical systems, the PA 2019 acts as a variable gain amplifier whose gain is controlled by the DSP 2005 from information received from a network base station. The signal is then filtered within the duplexer 2021 and optionally sent to an antenna coupler 2035 to match impedances to provide maximum power transfer. Finally, the signal is transmitted via antenna 2017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 2001 are received via antenna 2017 and immediately amplified by a low noise amplifier (LNA) 2037. A down-converter 2039 lowers the carrier frequency while the demodulator 2041 strips away the RF leaving only a digital bit stream. The signal then goes through the equalizer 2025 and is processed by the DSP 2005. A Digital to Analog Converter (DAC) 2043 converts the signal and the resulting output is transmitted to the user through the speaker 2045, all under control of a Main Control Unit (MCU) 2003—which can be implemented as a Central Processing Unit (CPU) (not shown).

The MCU 2003 receives various signals including input signals from the keyboard 2047. The keyboard 2047 and/or the MCU 2003 in combination with other user input components (e.g., the microphone 2011) comprise a user interface circuitry for managing user input. The MCU 2003 runs a user interface software to facilitate user control of at least some functions of the mobile station 2001 to generate a passenger-based driving profile. The MCU 2003 also delivers a display command and a switch command to the display 2007 and to the speech output switching controller, respectively. Further, the MCU 2003 exchanges information with the DSP 2005 and can access an optionally incorporated SIM card 2049 and a memory 2051. In addition, the MCU 2003 executes various control functions required of the station. The DSP 2005 may, depending upon the implementation, perform any of a variety of conventional digital processing functions on the voice signals. Additionally, DSP 2005 determines the background noise level of the local environment from the signals detected by microphone 2011 and sets the gain of microphone 2011 to a level selected to compensate for the natural tendency of the user of the mobile station 2001.

The CODEC 2013 includes the ADC 2023 and DAC 2043. The memory 2051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 2051 may be, but not limited to, a single memory, CD, DVD, ROM, RAM, EEPROM, optical storage, or any other non-volatile or non-transitory storage medium capable of storing digital data.

An optionally incorporated SIM card 2049 carries, for instance, important information, such as the cellular phone number, the carrier supplying service, subscription details, and security information. The SIM card 2049 serves primarily to identify the mobile station 2001 on a radio network. The card 2049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   detecting, by a processor, an identity of a user of a vehicle through manual input at a user interface in the vehicle, an automated sensor in the vehicle, or a combination thereof;
   retrieving, by the processor, a passenger profile of the user based on the identity, wherein the passenger profile is generated based on sensor data indicating a reaction of the user to at least one vehicle driving behavior previously experienced by the user as a vehicle passenger, wherein the reaction of the user in the passenger profile comprises a first reaction of the user to the at least one vehicle driving behavior as a driver of the vehicle, and a second reaction of the user to the at least one vehicle driving behavior as a passenger of the vehicle not driving the vehicle, and wherein the vehicle driving behavior is selected from at least one of an acceleration pattern, braking pattern, distance to a neighboring vehicle, or speed in a curve;
   configuring, by the processor, the vehicle to operate based on the passenger profile, wherein the configuring of the vehicle comprises:
      adapting a driving style of a vehicle based on the passenger profile,
      computing at least one navigation route for the vehicle, wherein the at least one navigation route is linked with an estimated time of arrival,
      presenting in the user interface, the estimated time of arrival and a comfort level for the user for each computed navigation route; and
      controlling movement of the vehicle based on the passenger profile;
   retrieving one or more other passenger profiles of one or more other passengers;
   determining whether a common denominator driving behavior from among the passenger profile and the one or more other passenger profiles; and
   when no common denominator driving behavior can be determined, alerting the passengers of an incompatibility.

2. The method of claim 1, wherein the driving style is adapted when the vehicle is operating in an autonomous driving mode.

3. The method of claim 1, wherein the vehicle is a ride-share vehicle, the method further comprising:
   presenting a user interface to a driver of the ride-share vehicle to indicate a driving style preferred by the user based on the passenger profile.

4. The method of claim 1, further comprising:
   selecting the one or more other passengers to group with the user in the vehicle based on a similarity of the passenger profile and one or more other passenger profiles of the one or more other passengers.

5. The method of claim 1, wherein the configuring of the vehicle comprises selecting a driver for the vehicle based on the passenger profile.

6. The method of claim 1, wherein the configuring of the vehicle comprises determining a vehicle seating position for the user based on the passenger profile.

7. An apparatus comprising:
   at least one processor; and
   at least one memory including computer program code for one or more programs,
   the at least one memory and the computer program code configured to, with the at least one processor, cause the apparatus to perform at least the following:
      detect an identity of a user of a vehicle through manual input at a user interface in the vehicle, an automated sensor in the vehicle, or a combination thereof;
      retrieve a passenger profile of the user based on the identity, wherein the passenger profile is generated based on sensor data indicating a reaction of the user to at least one vehicle driving behavior previously experienced by the user as a vehicle passenger, wherein the reaction of the user in the passenger profile comprises a first reaction of the user to the at least one vehicle driving behavior as a driver of the vehicle, and a second reaction of the user to the at least one vehicle driving behavior as a passenger of the vehicle not driving the vehicle, and wherein the vehicle driving behavior is selected from at least one of an acceleration pattern, braking pattern, distance to a neighboring vehicle, or speed in a curve;
      configure the vehicle to operate based on the passenger profile, wherein the configuring of the vehicle comprises:

adapting a driving style of the vehicle based on the passenger profile, computing at least one navigation route for the vehicle, wherein the at least one navigation route is linked with an estimated time of arrival, presenting in the user interface, the estimated time of arrival and a comfort level for the user for each computed navigation route; and controlling movement of the vehicle based on the passenger profile;

retrieve one or more other passenger profiles of one or more other passengers;

determine whether a common denominator driving behavior from among the passenger profile and the one or more other passenger profiles; and when no common denominator driving behavior can be determined, alert the passengers of an incompatibility.

8. The apparatus of claim 7, wherein the vehicle is a ride-share vehicle, and wherein the apparatus is caused to further perform at least one of:

present a user interface to a driver of the ride-share vehicle to indicate a driving style preferred by the user based on the passenger profile; and select a driver of the vehicle based on the passenger profile.

9. The apparatus of claim 7, wherein the configuring of the vehicle causes the apparatus to further perform at least one of:

select a driver for the vehicle based on the passenger profile;

compute a navigation route for the vehicle based on the passenger profile; and determine a vehicle seating position for the user based on the passenger profile.

10. A non-transitory computer-readable storage medium carrying one or more sequences of one or more instructions which, when executed by one or more processors, cause an apparatus to perform:

detecting an identity of a user of a vehicle through manual input at a user interface in the vehicle, an automated sensor in the vehicle, or a combination thereof;

retrieving a passenger profile of the user based on the identity, wherein the passenger profile is generated based on sensor data indicating a reaction of the user to at least one vehicle driving behavior previously experienced by the user as a vehicle passenger, wherein the reaction of the user in the passenger profile comprises a first reaction of the user to the at least one vehicle driving behavior as a driver of the vehicle, and a second reaction of the user to the at least one vehicle driving behavior as a passenger of the vehicle not driving the vehicle, and wherein the vehicle driving behavior is selected from at least one of an acceleration pattern, braking pattern, distance to a neighboring vehicle, or speed in a curve;

configuring a vehicle to operate based on the passenger profile, wherein the configuring of the vehicle comprises:

adapting a driving style of a vehicle based on the passenger profile, computing at least one navigation route for the vehicle, wherein the at least one navigation route is linked with an estimated time of arrival, presenting in the user interface, the estimated time of arrival and a comfort level for the user for each computed navigation route; and controlling movement of the vehicle based on the passenger profile;

retrieving one or more other passenger profiles of one or more other passengers;

determining whether a common denominator driving behavior from among the passenger profile and the one or more other passenger profiles; and when no common denominator driving behavior can be determined, alerting the passengers of an incompatibility.

11. The non-transitory computer-readable storage medium of claim 10, wherein the vehicle is a ride-share vehicle, wherein the apparatus is caused to further perform at least one of:

presenting a user interface to a driver of the ride-share vehicle to indicate a driving style preferred by the user based on the passenger profile; and selecting a driver of the vehicle based on the passenger profile.

12. The non-transitory computer-readable storage medium of claim 10, wherein the configuring of the vehicle causes the apparatus to further perform at least one of:

selecting a driver for the vehicle based on the passenger profile;

computing a navigation route for the vehicle based on the passenger profile; and determining a vehicle seating position for the user based on the passenger profile.

13. The method of claim 1, wherein the first reaction of the user is different from the second reaction of the user.

* * * * *